(12) United States Patent
Izumi

(10) Patent No.: US 6,466,348 B1
(45) Date of Patent: Oct. 15, 2002

(54) TRUNK APPARATUS OF A WAVELENGTH-DIVISION-MULTIPLEXING COMMUNICATION SYSTEM FOR CONTROLLING A GAIN OF AN OPTICAL AMPLIFIER PROVIDED THEREIN

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/177,132

(22) Filed: Oct. 22, 1998

(30) Foreign Application Priority Data

Mar. 11, 1998 (JP) ............................................. 10-060068

(51) Int. Cl.[7] ............................................. H04B 10/02
(52) U.S. Cl. ...................................... 359/177; 359/194
(58) Field of Search ................................. 359/174, 124, 359/110, 177, 194

(56) References Cited

U.S. PATENT DOCUMENTS

| | | | | |
|---|---|---|---|---|
| 5,500,756 A | * | 3/1996 | Tsushima et al. | 359/174 |
| 5,600,466 A | * | 2/1997 | Tsushima et al. | 359/124 |
| 5,673,142 A | * | 9/1997 | Fatehi et al. | 359/341.41 |
| 5,694,386 A | * | 12/1997 | Hirajima et al. | 369/47.25 |
| 5,859,725 A | * | 1/1999 | Sugiya et al. | 359/337.13 |
| 5,883,735 A | * | 3/1999 | Sugiyama et al. | 359/341.42 |

FOREIGN PATENT DOCUMENTS

| | | |
|---|---|---|
| JP | 4-78827 | 3/1992 |
| JP | 5-160473 | 6/1993 |
| JP | 7-154368 | 6/1995 |

* cited by examiner

Primary Examiner—Jason Chan
Assistant Examiner—Christina Y Leung
(74) Attorney, Agent, or Firm—Staas & Halsey LLP

(57) ABSTRACT

A trunk apparatus prevents a signal error due to a fluctuation in an optical power in a WDM communication system. A monitoring and controlling signal transmitting and receiving circuit sends transmission power information regarding a transmission power monitored by a transmission power monitor to an immediately proceeding trunk apparatus located on a downstream side of the local trunk apparatus. The monitoring and controlling signal transmitting and receiving circuit receives the transmission power information sent from an immediately preceding trunk apparatus located on an upstream side, and sends the received transmission power information to an automatic gain control circuit. The automatic gain control circuit controls the optical amplifier based on the transmission power information received from the immediately preceding trunk apparatus so as to equalize the transmission power of the local trunk apparatus to the transmission power of the immediately preceding trunk apparatus.

12 Claims, 29 Drawing Sheets

FIG.27

| D1 | D2 | D3 | D4 | DEFINITION |
|---|---|---|---|---|
| 0 | 0 | 0 | 0 | NORMAL |
| 0 | 0 | 0 | 1 | COMMAND FOR RECOGNIZING PRESENCE OF BST (FOR ALL APPARATUSES) |
| 0 | 0 | 1 | 0 | COMMAND FOR TRANSFERRING DATA (FOR ID ONLY) |

FIG.28

| D5 | D6 | DEFINITION |
|---|---|---|
| 0 | 0 | NORMAL |
| 0 | 1 | ANSWERING |
| 1 | 1 | CONFIRMATION COMPLETED |

US 6,466,348 B1

TRUNK APPARATUS OF A WAVELENGTH-DIVISION-MULTIPLEXING COMMUNICATION SYSTEM FOR CONTROLLING A GAIN OF AN OPTICAL AMPLIFIER PROVIDED THEREIN

BACKGROUND OF THE INVENTION

1. Field of the Invention

The present invention relates to a trunk apparatus and a terminal apparatus used in a wavelength-division-multiplexing communication system and a monitoring and controlling method for the wavelength-division-multiplexing communication system.

2. Description of the Related Art

In a recent optical communication, an optical transmission system using a WDM (wavelength-division-multiplexing) technology has been put to practical use. FIGS. 1A, 1B and 1C show structures of such a system. FIG. 1A shows a case of a simplified structure; FIG. 1B shows a case in which an ADM (add/drop multiplexer) is used in the system; and FIG. 1C shows a case of a ring-type structure.

In the case of the simplified structure shown in FIG. 1A, a transmitting terminal 101 wavelength-division-multiplexes a transmission signal, and sends the signal to an optical cable. Trunk apparatuses 102 to 104 relay the signal so as to transmit the signal to a receiver terminal 105.

In the case of FIG. 1B in which ADMs are present, a WDM communication system (a) and a WDM communication system (b) are interconnected by ADMs 108 and 113. The ADM 108 drops a part of a signal from the transmitter terminal 106 to the ADM 113, and adds a signal from the ADM 113. The ADM 113 drops a part of a signal from the transmitter terminal 111 to the ADM 108, and adds a signal from the ADM 108. Thereby, intercommunication between the WDM communication system (a) and the WDM communication system (b) is achieved.

In the case of the ring-type structure shown in FIG. 1C, nodes 116A to 116D to which a terminal apparatus can be connected and ADMs 118A to 118D together form a ring-type network.

It should be noted that although the transmitter terminal apparatus or the receiver terminal apparatus is represented as a terminal apparatus, a single terminal apparatus may serve as both a transmitter terminal apparatus and a receiver terminal apparatus.

FIG. 2 shows a structure of a terminal apparatus of a WDM communication system. The terminal apparatus 119 wavelength-division-multiplexes signals sent from apparatuses 120 to 122, each apparatus being a SDH (synchronous digital hierarchy) terminal multiplexing apparatus or a SONET (synchronous optical network) terminal multiplexing apparatus, and sends the signals to a transmission path 135. The terminal apparatus 119 also wavelength-division-demultiplexes signals received via a transmission path 136, and sends the signals to the apparatuses 120 to 122. In the terminal apparatus 119, signals of wavelengths λ1 to λn are multiplexed by the transmitter-side wavelength division multiplexing apparatus 125 via a variable light attenuating apparatus 124. The multiplexed signal is amplified by a transmitter-side multi-wavelength amplifier 127, and is output to the transmitter-side transmission path 135. A WDM signal received via the receiver-side transmission path 136 is amplified by a receiver-side multi-wavelength amplifier 133. The amplified signal is demultiplexed into signals of each wavelength and is transmitted to the apparatuses 120 to 122. It should be noted that dispersion compensation fiber modules 126 and 134 are provided for compensating for a dispersion in an optical cable. Boosters 128 and 132 are booster units for additional exiting-light sources. An analyzer 129 is for a spectrum analysis. Each part in the terminal apparatus 119 is controlled by a central monitoring and controlling apparatus 123.

FIG. 3 shows an example of a structure which does not includes an ADM. A signal transmitted via a transmission path 152 is amplified by a multi-wavelength amplifier 143, and the amplified signal is sent to a transmission path 153. Similarly, a signal transmitted via a transmission path 154 is amplified by a multi-wavelength amplifier 146, and the amplified signal is sent to a transmission path 155. A monitoring and controlling apparatus 151 including monitoring and controlling units 144 and 145 is connected to the multi-wavelength amplifiers 143 and 146 so as to monitor and control the WDM communication system.

FIG. 4 shows an example of a structure which includes an ADM. A signal transmitted via the transmission path 152 is amplified by a multi-wavelength amplifier 159, and input to an ADM 158. An output signal of the ADM 158 is amplified by a multi-wavelength amplifier 161, and the amplified signal is sent to the transmission path 153. Similarly, a signal transmitted via the transmission path 154 is amplified by a multi-wavelength amplifier 162, and input to the ADM 158. An output signal of the ADM 158 is amplified by a multi-wavelength amplifier 160, and the amplified signal is sent to the transmission path 155. A signal of a wavelength λa on a transmission path 156 is added by the ADM 158, and a signal of a wavelength λd is dropped to a transmission path 157 by the ADM 158. It should be noted that dispersion compensation fiber modules 140 and 148 are provided for compensating for dispersion in an optical cable. BST boosters 141 and 147 are booster units for additional exiting-light sources. Each part in the apparatus is controlled by a central monitoring and controlling apparatus 149.

FIG. 5 shows an example of a structure of an ADM (passive) having no switch circuit. A wavelength-division-multiplex signal transmitted through a transmission path 163 is wavelength-division-demultiplexed by a wavelength-division-demultiplexing apparatus 164. A signal of a wavelength λd is dropped from among the demultiplexed wavelengths, and the rest of the wavelengths are input to a wavelength-division-multiplexing apparatus 165. Additionally, a signal of a wavelength λa is added to the wavelength-division-multiplexing apparatus 165. Signals of the wavelengths including the wavelength λa are wavelength-division-multiplexed by the wavelength-division-multiplexer 165, and the multiplexed signal is output to a transmission path 166.

FIG. 6 shows an example of a structure of an ADM (active) having a switch circuit. A plurality of switch circuits 172 to 177 are provided so as to select wavelengths to be dropped. The remaining structure is the same as the ADM shown in FIG. 5.

FIG. 7 shows an example of a structure of a monitoring and controlling apparatus 180. A monitoring and controlling signal having 1 to n channels is input via a transmission path 181, and is converted into an electric signal by an optoelectric converter 183. The signal is input to a serial/parallel converter 187 via a frame end unit 186, and is subjected to a serial/parallel conversion so as to obtain a monitoring and controlling signal 193. On the other hand, a monitoring and controlling signal 194 having 1 to n channels is input to a parallel/serial converter 189 and is converted into a serial signal. Then, a frame for synchronization is added to the serial signal by a frame generating unit 188, and the serial signal is converted into an optical signal by an electrooptic converter 184. The optical signal is transmitted through a transmission path 182.

It should be noted that a clock received by the optoelectric converter 183 is supplied to the frame synchronization circuit 185, and a frame pulse is supplied from the frame synchronization circuit 185 to the frame end unit 186. Additionally, the clock received by the optoelectric converter 183 is also supplied to a selector 192. The selector 192 selects one of the clock, an output of an oscillator 191 and clocks 195 received from outside. The selected clock is supplied to a pulse-generating unit 190. An output of the pulse-generating unit 190 is supplied to the parallel/serial conversion circuit 189 and the frame-generating unit 188.

FIG. 8 is an illustration of a simplified structure shown in FIG. 1A which is further simplified and represented in view of a wavelength. A plurality of modulated light signals having different wavelengths ($\lambda 1$ to $\lambda 4$) are multiplexed by a transmission-side terminal apparatus 1, and transmitted through a single optical fiber 4. The optical fiber transmission path 4 is provided with an optical amplifier 2. The optical amplifier 2 amplifies the light signals ($\lambda 1$ to $\lambda 4$) at the same time, and transmits the light signals to a receiver-side terminal apparatus 3. The receiver-side terminal apparatus 3 demultiplex the multiplexed signal, and distributes the light signals on an individual wavelength basis.

Since the multi-wavelength optical amplifier 2 simply amplifies a light signal, an output level of the optical amplifier 2 is ordinarily controlled to be constant by an ALC (automatic level control). Accordingly, if, for example, the light signal having the wavelength $\lambda 2$ is cut off, the optical amplifier 2 increases the amplification of other light signals having the wavelengths $\lambda 1$, $\lambda 3$ and $\lambda 4$ so as to maintain the total output level. As a result, the light signals having the wavelengths $\lambda 1$, $\lambda 3$ and $\lambda 4$ are unnecessarily amplified. This may cause interference between the light signals of the different wavelengths or a sharp change in a level of a received light signal at a receiver, resulting in an error in the transmitted information. Especially, since the interference between signals of different wavelengths continuously occurs, it may become difficult to perform communication when the interference is serious.

In order to eliminate such a problem in a control using an ALC technique, there is a method for detecting a cut-off of a light signal by providing a photodiode to an optical amplifier for each signal of an individual wavelength. However, this method creates another problem in that a number of monitors at a final stage must be determined and provided at a design stage for future use since a number of monitors equal to a number of signals of different wavelengths to be multiplexed must be provided, and an increase in the number of signals of different wavelengths to be multiplexed is uneconomical.

Additionally, there is a method in which a monitoring signal is provided for signals of each wavelength. That is, a signal of each wavelength is frequency-modulated by a modulation different from a modulation according to a signal. The frequency of the frequency modulation is different for signals of each wavelength. In an optical amplifier, a single photodiode is provided to receive all the signals of the different wavelengths. The received signals of different wavelengths are split by a filter so as to obtain each frequency-modulated wave. The frequency-modulated wave is demodulated so as to detect a cut-off of a signal of each wavelength. In this case, a filter circuit must be designed in consideration of a number of signals of different wavelengths to be used.

Considering the above-mentioned situation, a method using an optical monitoring line has been put to use as a method for controlling a gain of an optical amplifier in a WDM communication field. That is, an optical line for monitoring and controlling is provided separately from a signal transmission path so as to provided information of a signal currently input to each optical amplifier by sending the monitoring and controlling signal through the monitoring line. Each optical amplifier controls a gain in accordance with the information.

In this case, if a number of signals of different wavelengths to be used is increased or decreased during practical use, such information is provided to each optical amplifier through the monitoring line. Accordingly, each optical amplifier can be shifted to a gain control state responsive to a new number of wavelengths. Additionally, if a signal of a wavelength being used is cut off during an operation, such a cut-off can be detected by a transmitter-side terminal apparatus and the transmitter-side terminal apparatus may notify each optical amplifier of the cut-off. Thus, each optical amplifier may control a gain in accordance with such information.

Additionally, as shown in FIGS. 4 to 6, an optical amplifier is able to have an optical ADM function using wavelength selectivity, and such an ADM is used in a ring-type network. FIG. 9 shows an example of a structure of a WDM communication system using an optical amplifier having an ADM function. An optical amplifier 15 drops signals of wavelengths input from an optical transmission path 17, and adds signals of new wavelengths 6. Accordingly, the number of signals of different wavelengths at the optical amplifier 16 and supplied to a transmitter-side terminal apparatus 13 is a sum of the number of signals of wavelengths 6 added by the optical amplifier A 16 and the number of signals of wavelengths 7 transmitted from a transmitter-side terminal apparatus 11.

In a conventional technique in which a gain control is performed by transmitting a monitoring and controlling signal for an optical amplifier through a monitoring line, there are the following problems.

(1) When a number of signals of different wavelengths is changed, such information is provided to each optical amplifier via the monitoring line. Each optical amplifier shifts to a gain control state responsive to a new number of signals of different wavelengths in accordance with the information. However, if an added signal of a new wavelength reaches each optical amplifier before the information notifying of an increase in the number of signals of different wavelengths reaches each optical amplifier, a power of a signal of each wavelength is decreased due to an ALC control. This decrease may last for a very short time, but a burst error may be generated.

(2) If a signals of certain wavelength is cut off, a transmitter-side terminal apparatus provides such information to each optical amplifier via the monitoring line. Each optical amplifier controls a gain according to the information. However, it takes a certainiperiod after the signal of the certain wavelength is cut off for the terminal apparatus to detect the cut-off and provide the information to each optical amplifier via the monitoring line. During this period, each optical amplifier does not recognize the fact that the signal of the certain wavelength was cut off. Thus, a power of signal of the other wavelengths is increased for a short time due to ALC. The period is very short, but a burst error may be generated.

(3) If an optical ADM function using optical wavelength selectivity is provided to an optical amplifier, a number of signals of different wavelengths input to the optical amplifier is not always equal to a number of signals of different wavelengths transmitted from a terminal apparatus. Accordingly, a number of signals of different wavelengths is monitored at a certain points in the network so as to provide information of a number of signals of different wavelengths input to each optical amplifier. In the case of FIG. 9, if a signal of a wavelength added by the optical amplifier 15 is cut off, a number of signals of different wavelengths input to the optical amplifier 16 is changed. However, since the transmitter-side terminal apparatus 13 merely manages the number of signals of different wavelengths output therefrom, information indicating the fact that the signals of the wavelength added by the optical amplifier 15 was cut off cannot be provided to the optical amplifier 16. Accordingly, a power of each signal of each wavelength at the optical amplifier 16 is increased due to the ALC, and a transmission error may be generated.

SUMMARY OF THE INVENTION

It is a general object of the present invention to provide an improved and useful trunk apparatus used in a WDM communication system in which the above-mentioned problems are eliminated.

A more specific object of the present invention is to provide a trunk apparatus which prevents a signal error due to a fluctuation in an optical power in a WDM communication system.

In order to achieve the above-mentioned objects, there is provided according to one aspect of the present invention a trunk apparatus of a wavelength-division-multiplex communication system comprising:

an optical amplifier;

a transmission power monitor for monitoring a transmission power of the trunk apparatus;

a monitoring and controlling signal transmitting and receiving circuit for transmitting and receiving a monitoring and controlling signal; and an automatic gain control circuit for performing an automatic gain control with respect to the optical amplifier, wherein the monitoring and controlling signal transmitting and receiving circuit sends transmission power information regarding the transmission power monitored by the transmission power monitor to an immediately proceeding trunk apparatus located on a downstream side of the local trunk apparatus;

the monitoring and controlling signal transmitting and receiving circuit receives transmission power information sent from an immediately preceding trunk apparatus located on an upstream side of the local trunk apparatus, and sends the received transmission power information to the automatic gain control circuit; and the automatic gain control circuit controls the optical amplifier based on the transmission power information received from the immediately preceding trunk apparatus so as to equalize the transmission power of the local trunk apparatus to the transmission power of the immediately preceding trunk apparatus.

According to the above-mentioned invention, the trunk apparatus of a wavelength-division-multiplex communication system sends a transmission power information to the immediately proceeding trunk apparatus. Additionally, the trunk apparatus performs an automatic gain control with respect to the optical amplifier based on received transmission power so that the transmission power of the trunk apparatus is equalized to a transmission power information of the immediately preceding trunk apparatus. Accordingly, if a number of signals of different wavelengths to be transmitted is changed, the transmission power can be maintained to be constant. Thus, there is no fluctuation in the transmission power, which results in prevention of a signal error due to fluctuation in an optical power.

The trunk apparatus according to the present invention may further comprise:

a reception power monitor for monitoring a reception power; and a loss calculating circuit for calculating a loss of a transmission path between the local trunk apparatus and the immediately preceding trunk apparatus, wherein the loss calculating circuit calculates the loss of the transmission path between the local trunk apparatus and the immediately preceding trunk apparatus based on an output of the reception power monitor and the transmission power information received from the immediately preceding trunk apparatus; and the automatic gain control circuit controls the optical amplifier based on a result of the calculation of the loss calculating circuit so as to compensate for the loss of the transmission path between the local trunk apparatus and the immediately preceding trunk apparatus.

According to this invention, the trunk apparatus sends transmission power information to the immediately proceeding trunk apparatus. Additionally, the trunk apparatus obtains transmission power information from the immediately preceding trunk apparatus so as to calculate a loss of the transmission path between the trunk apparatus and the immediately preceding trunk apparatus. The trunk apparatus performs an automatic gain control with respect to the optical amplifier so that the loss of the transmission path between the local trunk apparatus and the immediately preceding trunk apparatus is compensated for. Thus, the transmission power of the trunk apparatus is equalized to a transmission power of the immediately preceding trunk apparatus. Accordingly, if a number of signals of different wavelengths to be transmitted is changed, the transmission power can be maintained to be constant. Thus, there is no fluctuation in the transmission power which results in prevention of a signal error due to fluctuation in an optical power.

The above-mentioned trunk apparatus may further comprise:

a direct-current light source having a predetermined transmission power; and means for transmitting an output of the direct-current light source to the immediately proceeding trunk apparatus, wherein the loss calculating circuit calculates the loss of the transmission path between the local trunk apparatus and the immediately preceding trunk apparatus based on the output of the reception power monitor for a direct-current light source of the immediately preceding trunk apparatus and information regarding a transmission power of the direct-current light source of the immediately preceding trunk apparatus, instead of calculating the loss based on the output of the reception power monitor and the transmission power information of the immediately preceding trunk apparatus.

According to this invention, the direct current light source is exclusively provided to measure a reception power. Since a transmission power of the direct-current light source does not fluctuate, an accurate calculation of the loss of the transmission path between the trunk apparatus and the immediately preceding trunk apparatus can be achieved.

Additionally, in the above-mentioned trunk apparatus, the transmission power monitor may monitor the direct-current light source;

the monitoring and controlling signal transmitting and receiving circuit may send transmission power information regarding a transmission power of the direct-current light source monitored by the transmission power monitor to the immediately proceeding trunk apparatus; and the loss calculating circuit may calculate the loss of the transmission path between the local trunk apparatus and the immediately preceding trunk apparatus based on the output of the reception power monitor for the direct-current light source of the immediately preceding trunk apparatus and information regarding the transmission power of a direct current light source of the immediately receding trunk apparatus supplied by the monitoring and controlling signal transmitting and receiving circuit.

Accordingly, even when there is a dispersion in a power of the direct current light source of the immediately preceding trunk apparatus, the loss of the transmission path between the trunk apparatus and the immediately preceding trunk apparatus can be accurately calculated since the transmission power information of the direct-current light source provided in the immediately preceding trunk apparatus is used for the calculation of the loss.

Additionally, the trunk apparatus according to the present invention may further comprise:

a monitoring and controlling signal light having a predetermined transmission power; and means for transmitting the monitoring and controlling signal light to the immediately proceeding trunk apparatus, wherein the loss calculating circuit calculates the loss of the transmission path between the local trunk apparatus and the immediately preceding trunk apparatus based on the output of the reception power monitor for the monitoring and controlling signal light of the immediately preceding trunk apparatus and information regarding a transmission power of the monitoring and controlling signal light of the immediately preceding trunk apparatus, instead of calculating the loss based on the output of the reception power monitor and the transmission power information of the immediately preceding trunk apparatus received by the monitoring and controlling signal transmitting and receiving apparatus.

According to this invention, the monitoring and controlling signal light of the immediately preceding trunk apparatus has a known power level, and the loss of, the transmission path between the trunk apparatus and the immediately preceding trunk apparatus is calculated based on the reception power of the monitoring and controlling signal light of the immediately preceding trunk apparatus. Thus, there is no need to send transmission power information by the monitoring and controlling signal.

In the above-mentioned trunk apparatus, the transmission power monitor may monitor the monitoring and controlling signal light;

the monitoring and controlling signal transmitting and receiving circuit may send transmission power information regarding a transmission power of the monitoring and controlling signal light monitored by the transmission power monitor to the immediately proceeding trunk apparatus; and the loss calculating circuit may calculate the loss of the transmission path between the local trunk apparatus and the immediately preceding trunk apparatus based on the output of the reception power monitor for the monitoring and controlling signal light of the immediately preceding trunk apparatus and information regarding the transmission power of the monitoring and controlling signal light of the immediately preceding trunk apparatus supplied by the monitoring and controlling signal transmitting and receiving circuit.

Accordingly, the transmission power information of the monitoring and controlling signal light is sent to the immediately proceeding trunk apparatus. Thus, when a power of the monitoring and controlling signal light of the immediately preceding trunk apparatus fluctuates, the trunk apparatus can accurately calculate the loss of the transmission path between the trunk apparatus and the immediately preceding trunk apparatus.

Additionally, a power level of the monitoring and controlling signal light may be periodically set to a constant level. Accordingly, a reception power of the monitoring and controlling signal light can be measured in an area of the light where the power level is constant. Thus, the loss of the transmission path between the trunk apparatus and the immediately preceding trunk apparatus can be accurately calculated.

Additionally, the trunk apparatus according to the present invention may be provided with an add-drop-multiplexer. Further, the trunk apparatus according to the present invention may be provided with a memory unit for storing information regarding the automatic gain control.

Additionally, there is provided according to another aspect of the present invention a trunk apparatus of a wavelength-division-multiplex communication system having an add and drop multiplexing function, the trunk apparatus comprising:

an optical amplifier;

a transmission power monitor for monitoring a transmission power of the trunk apparatus;

a monitoring and controlling signal transmitting and receiving circuit for transmitting and receiving a monitoring and controlling signal; and an automatic gain control circuit for performing an automatic gain control with respect to the optical amplifier, wherein the monitoring and controlling signal transmitting and receiving circuit sends transmission power information to an immediately proceeding trunk apparatus located on a downstream side of the local trunk apparatus, the transmission power information regarding a total transmission light except for a monitoring and controlling signal light of the local trunk apparatus;

the monitoring and controlling signal transmitting and receiving circuit receives transmission power information sent from an immediately preceding trunk apparatus located on an upstream side of the local trunk apparatus, and sends the received transmission power information to the automatic gain control circuit; and the automatic gain control circuit controls the optical amplifier based on the transmission power information received from the immediately preceding trunk apparatus so as to equalize the transmission power of the local trunk apparatus to the transmission power of the immediately preceding trunk apparatus.

According to this invention, when a number of signals of different wavelengths is changed according to the add and drop multiplexing function, the power of the signal received by the trunk apparatus is always at a constant level. Thus, generation of a signal error due to a fluctuation in the optical power can be prevented.

The above-mentioned trunk apparatus may be provided with a memory unit for storing information regarding the automatic gain control.

Accordingly, when a failure occurs in the monitoring and controlling signal or a light source for measurement, a normal operation can be resumed by using information stored in the memory. Thus, an erroneous operation of the optical amplifier can be prevented, and there is no situation in which communication cannot be performed using signals of different wavelengths. Additionally, the monitoring and controlling signal transmitting and receiving circuit can be replaced without problems.

Additionally, there is provided according to another aspect of the present invention a method for monitoring and controlling a wavelength-division-multiplex communication system, comprising the steps of:

collecting present reception power information and amplification limit value information with respect to all optical amplifiers through which a signal light having an additional wavelength passes, the signal light of the additional wavelength being added to signal lights of wavelengths being used, the collection of information being performed before a light source of the signal light of the additional wavelength is turned on:

determining whether or not the signal light of the additional wavelength can be added without decreasing a power of each of the signal lights of wavelengths being used based on the collected information;

turning on the light source when the signal light of the additional wavelength can be added without decreasing the power of each of the signal light of the wavelengths being used; and prohibiting an addition of the additional wavelength when the signal lights of the additional wavelength cannot be added without decreasing the power of each of the signal lights of the wavelengths being used.

According to the above-mentioned invention, the number of signal lights of wavelengths to be used is prevented from being excessively increased. Thus, the trunk apparatus can maintain an appropriate automatic gain control function.

Additionally, there is provided according to another aspect of the present invention a method for monitoring and controlling a wavelength-division-multiplex communication system, comprising the steps of:

transmitting a signal of an additional wavelength added to signals of wavelengths being used by gradually increasing a power of the signal of the additional wavelength, an addition of the signal of the additional wavelength being made at a terminal apparatus;

sending an alarm from a trunk apparatus to all directions when a power level of a signal received by the trunk apparatus exceeds a limit of amplification of an optical amplifier provided in the trunk apparatus, the limit of amplification being previously set to a small value having a margin; and canceling an addition of the signal of the additional wavelength by immediately decreasing a power of the signal of the additional wavelength when the terminal apparatus receives the alarm sent from the trunk apparatus.

According to the present invention, the number of signals of the wavelengths to be used is prevented from being excessively increased even when a path through which a signal of a wavelength to be added passes is unknown. Thus, the trunk apparatus can maintain an appropriate automatic gain control function.

Additionally, there is provided according to another aspect of the present invention a method for monitoring and controlling a wavelength-division-multiplex communication system, comprising the steps of:

sending transmission power information to an immediately proceeding trunk apparatus located on a downstream side, the transmission power information being sent from one of a transmitting terminal apparatus and trunk apparatuses; and performing an automatic gain control with respect to an optical amplifier provided in each of the trunk apparatuses based on transmission power information received from an immediately preceding trunk apparatus so as to equalize a transmission power of each trunk apparatus to a transmission power of the immediately preceding trunk apparatus.

Additionally, there is provided according to another aspect of the present invention a terminal apparatus of a wavelength-division-multiplex communication system comprising:

a monitoring and controlling signal transmitting and receiving circuit for transmitting and receiving a monitoring and controlling signal; and a light source for a signal light of an additional wavelength to be added to signal lights of wavelengths being used, wherein the monitoring and controlling signal transmitting and receiving circuit collects present reception power information and amplification limit value information with respect to all optical amplifiers through which the signal light having the additional wavelength passes, the collection of information being performed before the light source of the signal light of the additional wavelength is turned on; and the monitoring and controlling signal transmitting and receiving circuit determines whether or not the signal light of the additional wavelength can be added without decreasing a power of each of the signal lights of the wavelengths being used based on the collected information so as to turn on the light source only when the signal light of the additional wavelength can be added without decreasing the power of each of signal lights of the wavelengths being used.

Additionally, there is provided according to another aspect of the present invention a terminal apparatus of a wavelength-division-multiplex communication system comprising:

a monitoring and controlling signal transmitting and receiving circuit for transmitting and receiving a monitoring and controlling signal; and a light source for a signal light of an additional wavelength to be added to signal lights of wavelengths being used, wherein the terminal apparatus transmits the signal light of the additional wavelength by gradually increasing a power of the signal light of the additional wavelength while receiving the monitoring and controlling signal sent from each trunk apparatus, and cancels an addition of the signal light of the additional wavelength by immediately decreasing a power of the signal light of the additional wavelength when the terminal apparatus receives the monitoring and controlling signal including an alarm sent from one of the trunk apparatuses, the alarm indicating that the addition of the signal light of the additional wavelength cannot be accepted by the one of the trunk apparatuses.

Other objects, features and advantages of the present invention will become more apparent from the following detailed description when read in conjunction with the accompanying drawings.

BRIEF DESCRIPTION OF THE DRAWINGS

FIG. 27 is an illustration for explaining a definition of OPCODE;

FIG. 28 is an illustration for explaining a definition of FLG; and

DETAILED DESCRIPTION OF THE PREFERRED EMBODIMENTS

A description will now be given, with reference to the drawings, of embodiments of the present invention.

Figure 10:
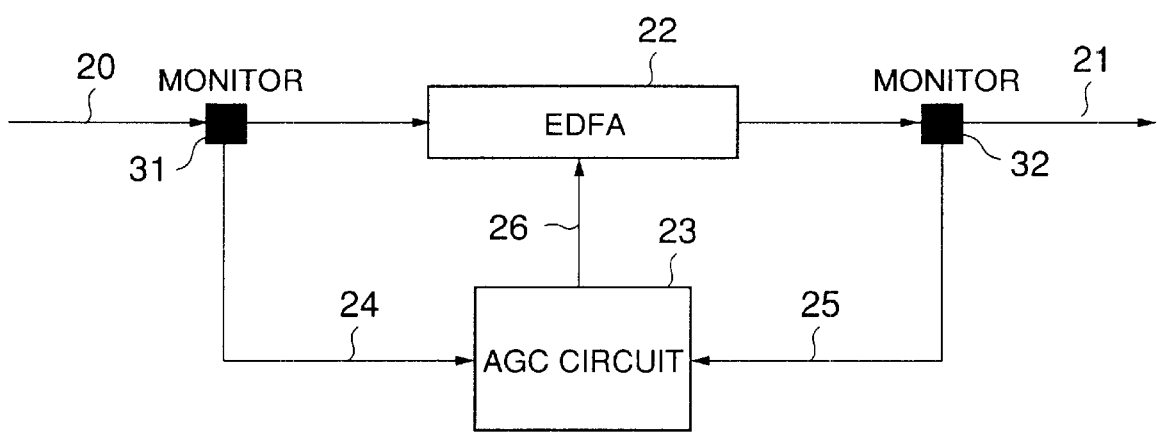
FIG. 10 is an illustration of a structure of an optical amplifier controlled by an AGC circuit.

Principle of the present invention:

The reason for performing an ALC control in an optical amplifier is that intervals of trunk apparatuses are not uniform and there is a fluctuation in a power loss due to change in environment. If the intervals of the trunk apparatuses are uniform and there is no fluctuation in a power loss, an optical amplifier can be controlled by an AGC (automatic gain control) circuit. Even if a number of signals of different wavelengths is changed, an output power of a signal of each wavelength does not change since a gain of each optical amplifier is controlled to be constant. FIG. 10 is an illustration of a structure of an optical amplifier controlled by an AGC circuit. In FIG. 10, an input power of an optical amplifier 22 (EDFA: Erbium Doped Fiber Amplifier) is monitored by a monitor 31, and an output power thereof is monitored by a monitor 32. An AGC circuit 23 controls the optical amplifier 22 so as to maintain a gain of the optical amplifier 22 to be constant.

Figure 11:
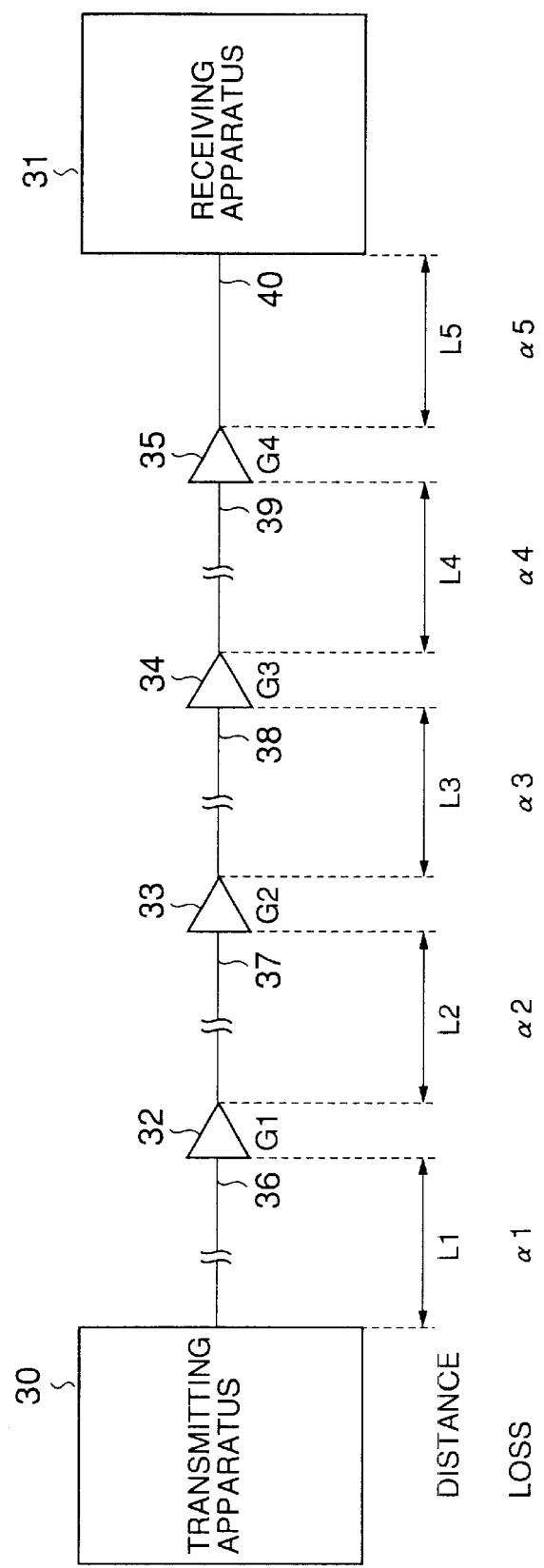
FIG. 11 is an illustration for explaining a loss in a WDM communication system.

Consideration is given to a multiple stage relay of optical amplifiers on a transmission path in which trunk distances (L1 to L5) are different from each other, as shown in FIG. 11. Each of optical amplifiers 32 to 35 amplifies an input optical power to a constant level. A gain of each of the optical amplifiers 32 to 35 is controlled so that a loss ($\alpha 1$ to $\alpha 5$) of the immediately preceding trunk interval is compensated for. That is, the optical amplifier 32 amplifies by $\alpha 1$ (G1=$\alpha 1$), and the optical amplifier 35 amplifies by $\alpha 4$ (G4=$\alpha 4$). As a result, an output power of a transmission apparatus 30 is equal to an output power of the optical amplifier 35.

A loss ($\alpha 1$ to $\alpha 5$) of an immediately preceding trunk distance of one of the optical amplifiers 32 to 35 can be obtained in accordance with information of a transmission power of a trunk apparatus immediately preceding the one of the optical amplifiers 32 to 35 and information of an input power of the one of the optical amplifiers 32 to 35. Accordingly, a gain of each of the optical amplifiers 32 to 35 is determined so as to compensate for the thus-obtained loss. In this case, even if a signal of a wavelength is added or deleted by a transmission apparatus, an output of each of the optical amplifiers 32 to 35 is maintained to be constant, and no fluctuation occurs in a power on the receiver side.

Figure 12:
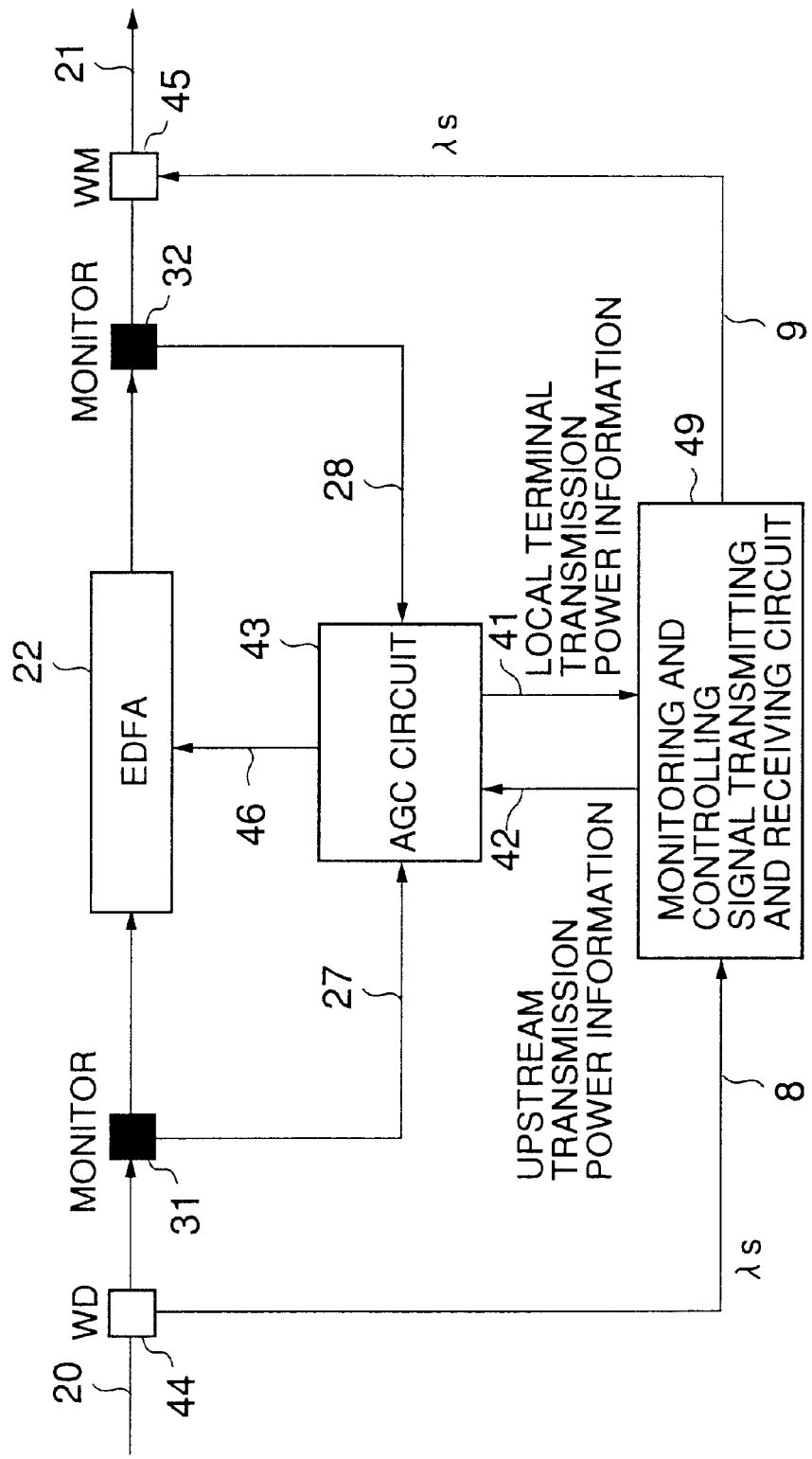
FIG. 12 is an illustration for explaining a structure of an AGC controlled optical amplifier according to a first embodiment of the present invention.

(1) A structure of an AGC control unit according to a first embodiment of the present invention:

FIG. 12 is an illustration of a structure of an AGC control unit in a WDM communication system according to the above-mentioned principle. A WDM signal of a number of different wavelengths on a transmission path 20 is transmitted via an optical wavelength-division-demultiplexing apparatus 44, a monitor 31, an EDFA 22, a monitor 32 and an optical wavelength-division-multiplexing apparatus 21. The wavelength-division-demultiplexing apparatus 44 demultiplexes a signal of a wavelength λs which carries a monitoring and controlling signal, and supplies the signal of the wavelength λs to a monitoring and controlling signal transmitting and receiving circuit 49. The monitor 31 detects a level of a received signal which is a signal before being amplified by the EDFA 22. The EDFA 22 is an optical amplifier. The monitor 32 monitors a signal to be transmitted which is a signal after being amplified by the EDFA 22. The wavelength-division-multiplexing apparatus 45 performs an optical wavelength-division multiplexing operation so that information of a local transmission power of its own from the monitoring and controlling signal transmitting and receiving circuit 49 is carried by the signal of the wavelength λs.

A description will now be given of an operation of the AGC control unit shown in FIG. 12. The AGC circuit 43 controls the EDFA (optical amplifier) 22 so as to maintain a gain of the EDFA 22. The control is performed based on an output 42 (upstream transmission power information) of the monitoring and controlling signal transmitting and receiving circuit 49, an output 27 (a level of received signal or a signal level before amplification) of the monitor 31 and an output 28 (a level of a signal to be transmitted or a level of a signal after amplification) of the monitor 32.

The transmission power information of the upstream side is carried by the signal of the wavelength λs for monitoring and controlling. The signal of the wavelength λs is dropped by the optical wavelength-division-demultiplexing apparatus 44, and is supplied to the monitoring and controlling signal transmitting and receiving circuit 49. The monitoring and controlling signal transmitting and receiving circuit 49 obtains information regarding a level of a transmission power of a preceding stage from digital information 8 carried by the signal of the wavelength λs, and supplies the information 42 to the AGC circuit 43. On the other hand, the output 27 (a level of the received signal) of the monitor 31 is supplied to the AGC circuit 43. Accordingly, the AGC circuit 43 obtains a loss α of a transmission path in the preceding stage.

Additionally, the gain of the optical amplifier (EDFA) 22 can be obtained by the AGC circuit 43 from the output 27 of the monitor 31 and the output 28 of the monitor 32. The AGC circuit 43 provides a control signal 46 so that the gain of the optical amplifier 22 is equal to the loss of the preceding stage. Thereby, the optical amplifier 22 compensates for the above-mentioned loss, and the output of the optical amplifier 22 is constant. Additionally, the digital value of the output power of the optical amplifier 22 is sent by the AGC circuit 43 via the monitoring and controlling signal transmitting and receiving circuit 49. The monitoring and controlling signal transmitting and receiving circuit 49 renders the signal of the wavelength λs to carry the digital value of the output power of the optical amplifier 22, and transmits the signal 9 via the optical wavelength-division-multiplexing apparatus 45.

Originally, a transmission power monitor and a reception power monitor are necessary for an AGC control. Accordingly, if the above-mentioned method according to the present invention is used, because there is no need to add a new monitor, the present invention is achieved at a low cost. Additionally, if there is a fluctuation of loss due to change in circumstances of a transmission path optical fiber, the fluctuation can be absorbed since the gain of the optical amplifier is determined based on the transmission power of the upstream side and the received power.

(2) A structure of an AGC control unit according to a second embodiment of the present invention:

In the following description, a description of parts that are the same as the parts described above will be omitted.

A power of each signal of each wavelength varies according to whether a modulation signal is "H" or "L". Accordingly, a level of the transmission power and the reception power are not constant and fluctuate according to the modulation signal. On the other hand, if the frequency is increased due to circumstances of an optical fiber and becomes nearly equal to the fluctuation by the modulation signal, it is not possible to accurately measure the level of the transmission power and the reception power.

Figure 13:
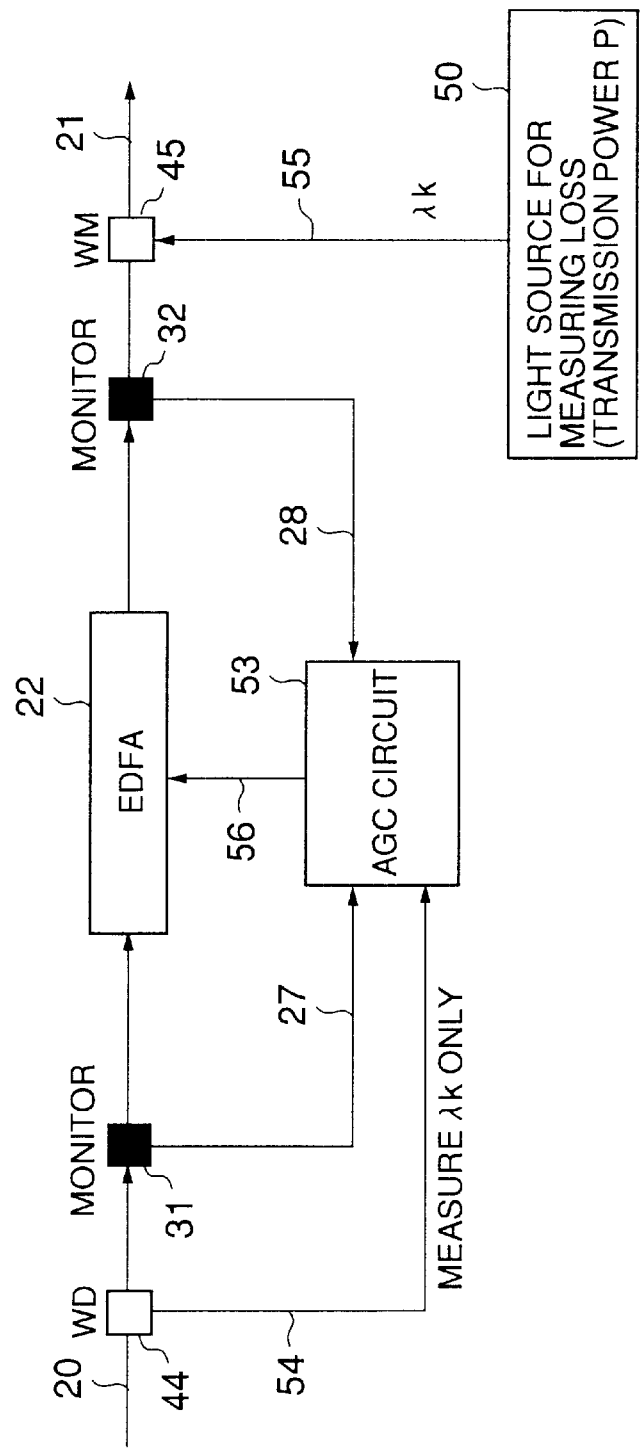
FIG. 13 is an illustration for explaining a structure of an AGC controlled optical amplifier according to a second embodiment of the present invention.

Accordingly, this problem is solved, as shown in FIG. 13, by providing a direct-current light source 50 (wavelength of λk) for measuring an optical fiber loss by detecting a light transmitted by the light source on a downstream side. That is, a light transmitted by the light source 50 having a known transmission power (p) is superimposed on a signal, and the signal is transmitted and detected on the downstream side. A level of attenuation of the signal is calculated based on the known power level (p) and a level of the received signal of the wavelength λk. The gain of the optical amplifier is determined so as to compensate for the calculated attenuation. In this case, there is no need to send information regarding the transmission power via the monitoring and controlling signal. The direct-current light source 50 is not commonly used for all trunk sections but is separately provided for each trunk section. If the direct-current light source 50 is commonly used for all trunk sections and if a difference is generated between an actual transmission power level and the known transmission power level, the difference may be accumulated, causing a problem. In the present invention, such a problem is solved by providing the light source for each trunk section. Additionally, when a dispersion is present in the power of the direct-current light source 50, the power of the direct-current light source 50 may be monitored so as to send information regarding the level of the transmission power downstream via the monitoring and controlling signal.

In FIG. 13, although a calculation of the level of attenuation on the transmission path is performed by the AGC circuit 53, this calculation may be performed by other circuits so as to use a result of calculation performed by other circuits.

(3) A structure of an AGC control unit according to a third embodiment of the present invention:

In the following description, a description of parts that are the same as the parts described above will be omitted.

Figure 14:
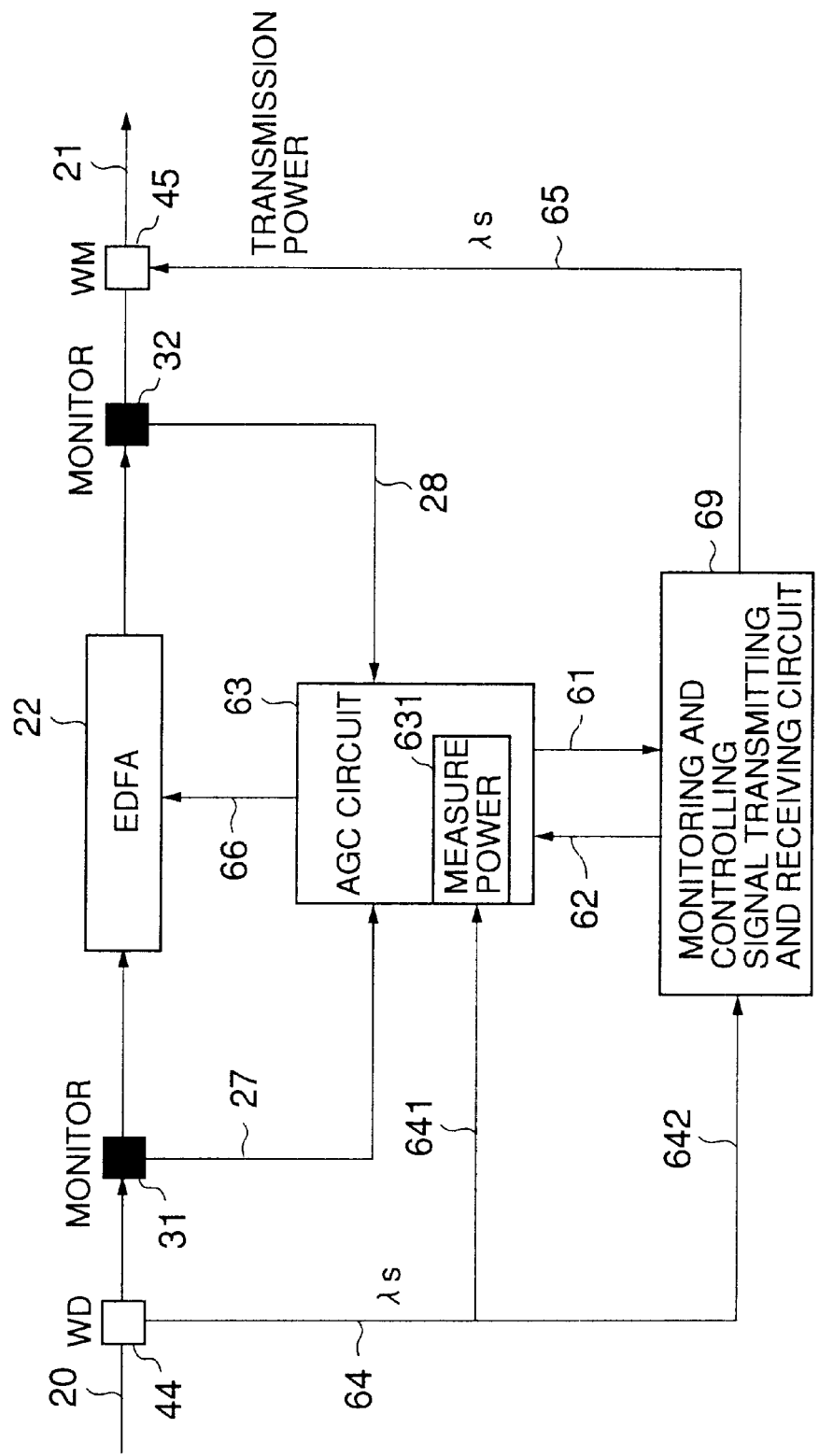
FIG. 14 is an illustration for explaining a structure of an AGC controlled optical amplifier according to a third embodiment of the present invention.

In the AGC control unit according to the above-mentioned second embodiment, a monitoring and controlling signal having a wavelength different from that of an ordinary monitoring and controlling signal must be generated by an optical amplifier trunk apparatus. If a light source for measurement is added as is in the second embodiment, it may increase a cost. Accordingly, in the present embodiment, a wavelength of the monitoring and controlling signal is used. In this case, the wavelength of the monitoring and controlling signal may be independent for each trunk section or may be common to all trunk sections. FIG. 14 shows such a structure. A level of a transmission power of a signal of a wavelength λs carrying a monitoring and controlling signal in the preceding stage is known. A power measuring circuit 631 of an AGC circuit 63 calculates a level of signal of the attenuation of the preceding trunk section based on the known transmission level of the signal of the wavelength λs and a level of the wavelength λs actually received via a transmission path 641, and determines a gain of the optical amplifier (EDFA) 22 so as to compensate for the calculated level of attenuation.

Figure 15:
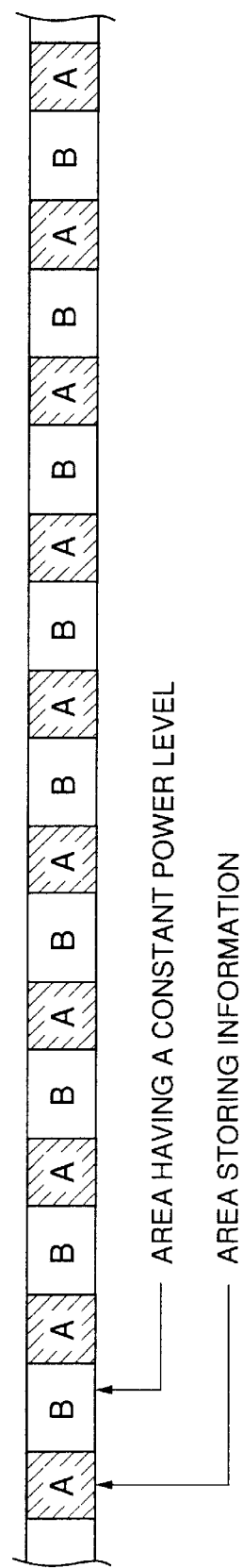
FIG. 15 is an illustration for explaining a structure of a monitoring and controlling signal.
Figure 16:
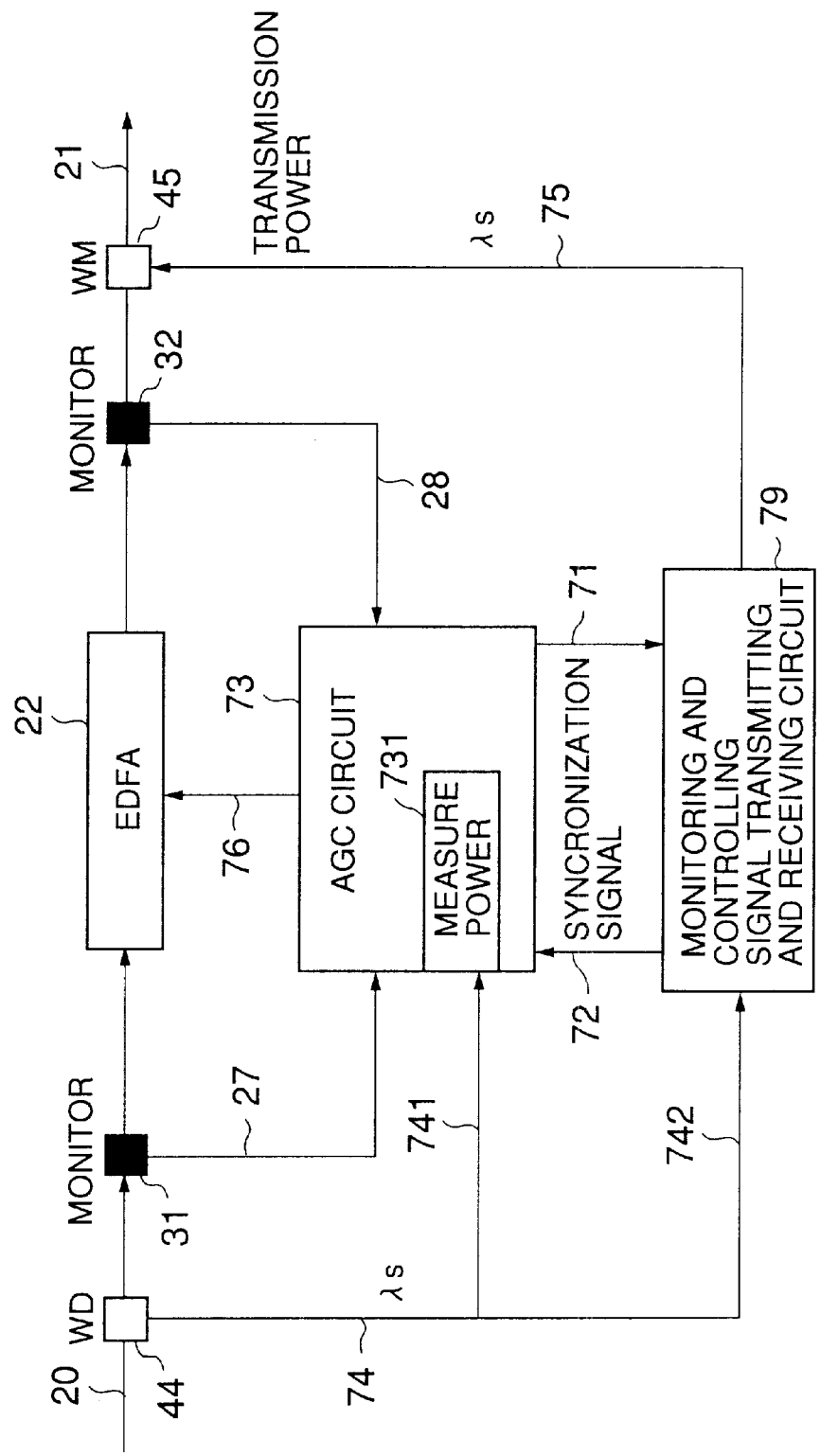
FIG. 16 is an illustration for explaining a structure of an AGC controlled optical amplifier according to a fourth embodiment of the present invention.

Additionally, there is no considerable problem in measuring a power level of the signal of the wavelength λs carrying the monitoring and controlling signal since a transmission speed of the monitoring and controlling signal is normally low and a fluctuation in the levels of "H" and "L" is small. However, if an amount of information to be transmitted by the monitoring and controlling signal is increased, the transmission speed of the monitoring and controlling signal is increased. This may create a problem in measuring a power level of the signal of the wavelength λs carrying the monitoring and controlling signal. In such a case, the monitoring and controlling signal may be structured as illustrated in FIG. 15. That is, the monitoring and controlling signal is divided into an area A for storing information and an area B having a constant power level. The power level of the signal of the wavelength λs can be measured by measuring a power level of the area B of the monitoring and controlling signal.

Additionally, a power level of the signal of the wavelength λs carrying the monitoring and controlling signal on the transmitter side may be monitored so as to send information regarding the power level downstream by the monitoring and controlling signal.

(4) A structure of an AGC control unit according to a fourth embodiment of the present invention:

In the following description, a description of parts that are the same as the parts described above will be omitted.

Figure 17:
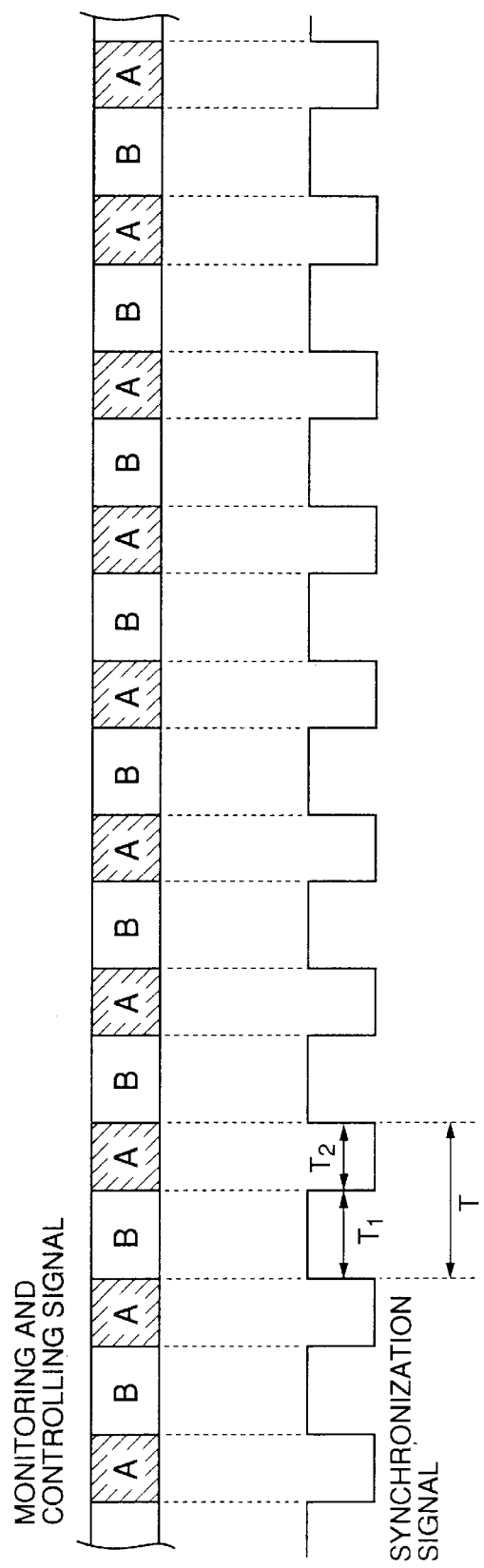
FIG. 17 is an illustration for explaining a structure of a synchronization signal.

This embodiment is a variation of the AGC controlling unit according to the third embodiment of the present invention in which the monitoring and controlling signal shown in FIG. 15 is produced by RZ coding. The RZ coding always provides "0" to each code. Thus, an accurate measurement can be achieved without the influence of information by measuring a level of received codes based on a level of "0". FIG. 17 illustrates such a monitoring and controlling signal. That is, the monitoring and controlling signal shown in FIG. 17 includes an information area A and an area B having a constant level. In this case, in order to measure a power level of the received signal, the area B must be distinguished from the area A. Accordingly, a synchronization signal must be produced for distinguishing the area B. Such a synchronization signal is indicated in a lower part of FIG. 17. A part indicated by T1 is a period in which a constant level is maintained. A monitoring and controlling signal transmitting and receiving circuit 79 produces the synchronization signal, and transfers the synchronization signal to a power measuring circuit 731 of an AGC circuit 73. The power measuring circuit 731 distinguishes the area B by using the synchronization signal, and accurately measures a level of the power of the signal of the wavelength λs in the received monitoring and controlling signal. It should be noted that a period T is set to be smaller than 1/(2Fmax) according to the sampling theorem, where Fmax is a maximum frequency of fluctuation in a loss of an optical transmission path.

Additionally, a power level of the signal of the wavelength λs of the monitoring and controlling signal on the transmitter side may be monitored so as to send information regarding the power level downstream by the monitoring and controlling signal.

(5) A structure of an AGC control unit according to a fifth embodiment of the present invention:

In the following description, a description of parts that are the same as the parts described above will be omitted.

Figure 18:
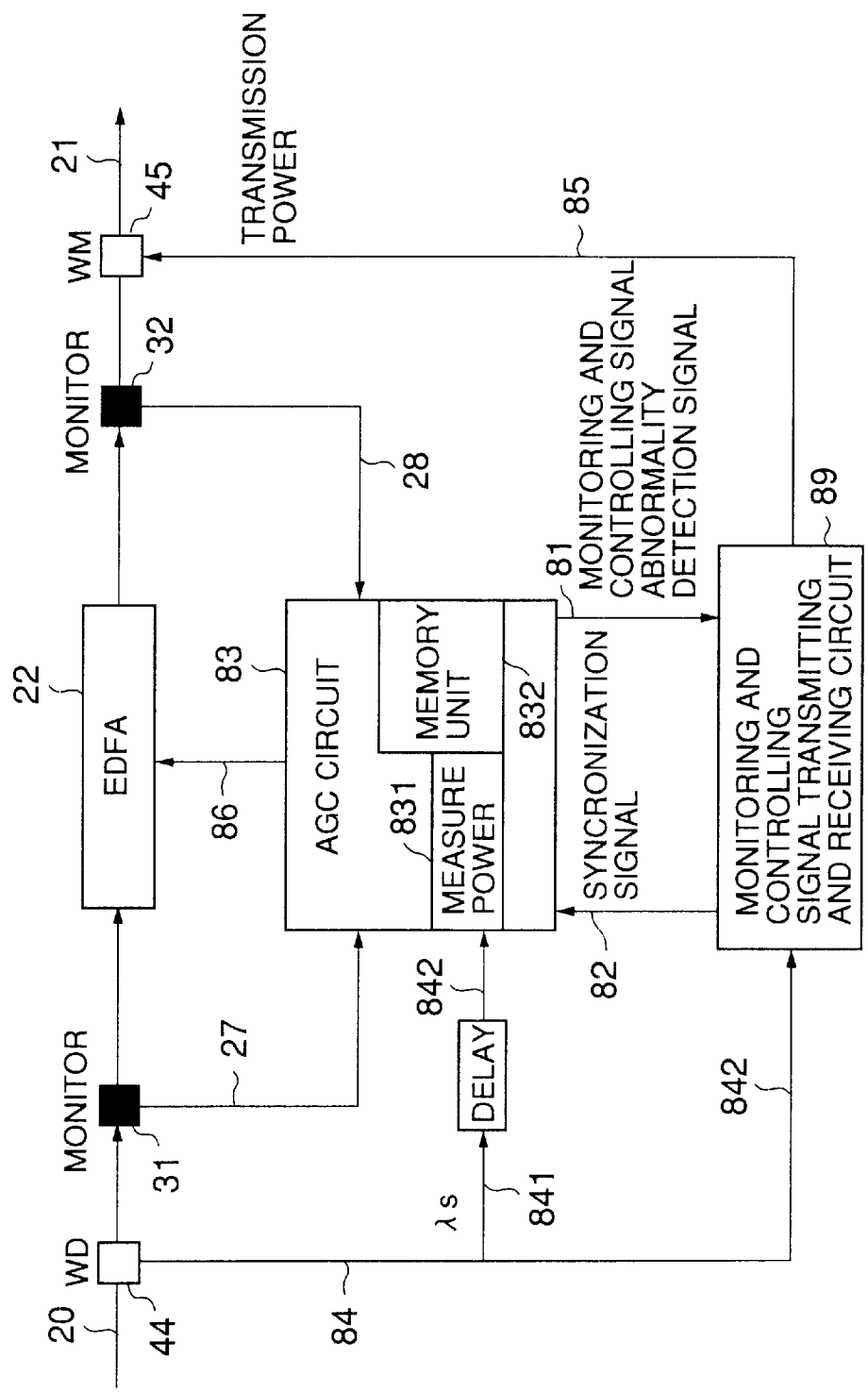
FIG. 18 is an illustration for explaining a structure of an AGC controlled optical amplifier according to a fifth embodiment of the present invention.

In the above-mentioned embodiments, if failure occurs in the monitoring and controlling signal or the light source, a gain of the optical amplifier cannot be determined. Accordingly, the optical amplifier may be erroneously operated which disables communication for the signals of all wavelengths. Thus, the transmission and reception unit of the monitoring and controlling signal or the light source must designed to be separate from other parts or replaceable with a new one. In order to eliminate the influence of failure in the monitoring and controlling signal or the measurement light source, each optical amplifier should be maintained in a state before the failure. FIG. 18 illustrates such a structure. That is, a memory unit 832 is provided in an AGC circuit 83 so as to store AGC control information which is based on the monitoring and controlling signal and the measurement light source, the information being always updated. When an abnormality such as failure occurs in the monitoring and controlling signal or the measurement light source, the AGC circuit 83 is operated by the stored AGC information in accordance with a monitoring and controlling signal abnormality detection signal 81 of a monitoring and controlling signal transmitting and receiving circuit 89.

It should be noted that the monitoring and controlling signal abnormality detection signal includes abnormality information of the monitoring and controlling signal transmitting and receiving circuit 89. Thus, removing the monitoring and controlling signal transmitting and receiving circuit 89 does not influence the network. On the other hand, when the monitoring and controlling signal transmitting and receiving circuit 89 is inserted, the monitoring and controlling signal abnormality detection signal 81 is generated until the monitoring and controlling signal becomes a normal value. Thus, inserting the monitoring and controlling signal transmitting and receiving circuit 89 does not influence the network.

Figure 19:
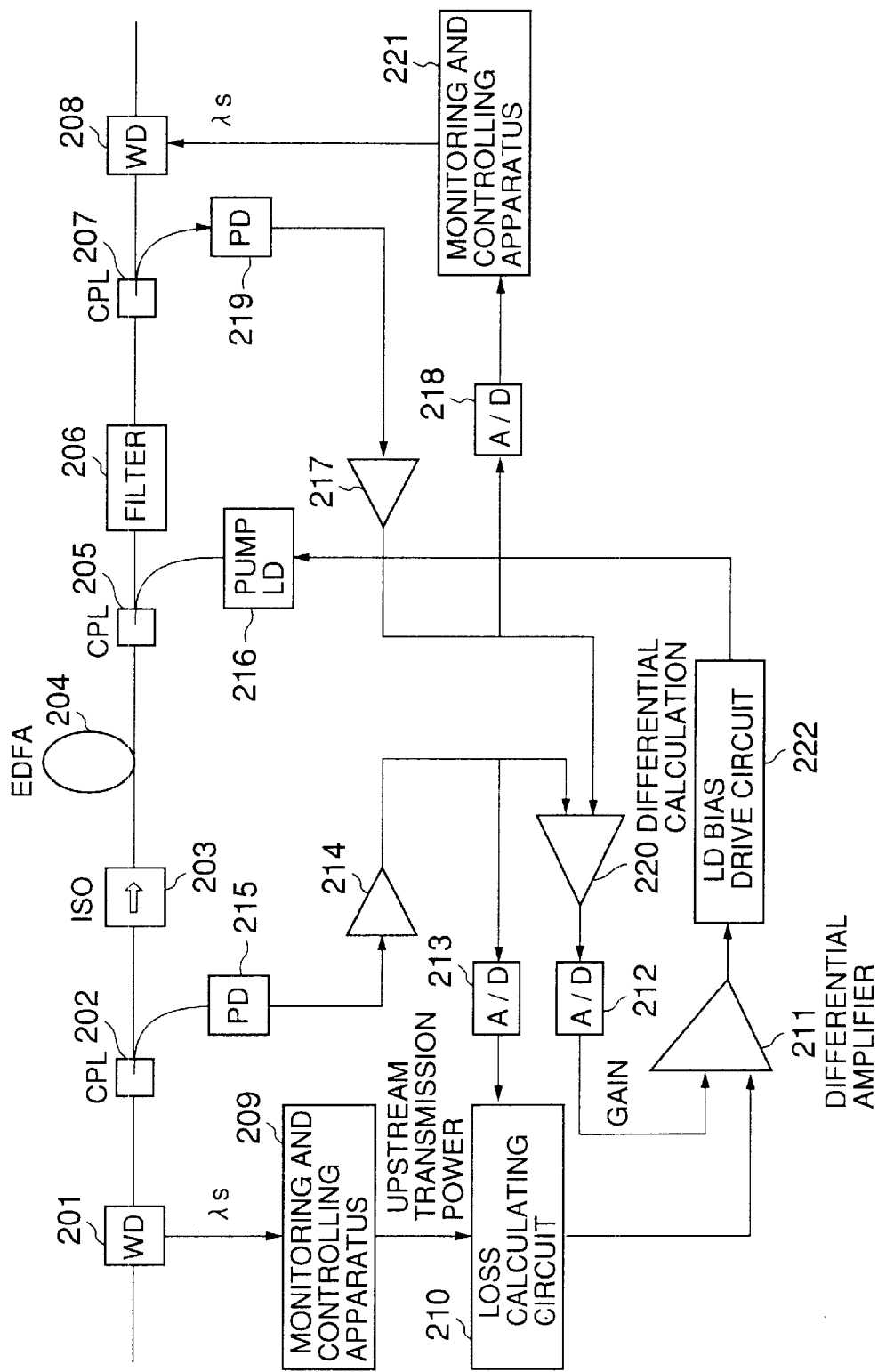
FIG. 19 is an illustration of a first example of an AGC control unit.

(6) A first example of a specific structure of the AGC control unit:

FIG. 19 shows a specific structure of an AGC control unit according to the present invention in a WDM communication system. A wavelength-division-multiplexed light signal is transmitted to the downstream via an optical wavelength-division-demultiplexing apparatus 201, an optical coupler 202, an optical isolator 203, an EDFA 204, an optical coupler 205, an optical wavelength filter 206, an optical coupler 207 and an optical wavelength-division-multiplexing apparatus 208. The monitoring and controlling signal has the wavelength λs, and the wavelength λs is also used for a monitoring line.

The optical wavelength-division-multiplexing apparatus 201 demultiplexes the signal of the wavelength λs, and supplies this signal to a monitoring and controlling apparatus 209. The optical coupler 202 branches a part of the received light signal, and supplies it to a photodetector 215. The optical isolator 203 prevents a reverse transmission of a light so as to prevent a pumping light of the EDFA 204 from leaking to the photodetector 215 which detects a power level of the received light signal. The EDFA 204 is an optical amplifier. The optical coupler 205 connects a pumping light source to the EDFA 204. The optical wavelength filter 206 eliminates unnecessary wavelengths. The optical coupler 207 branches a part of the light signal, and supplies it to a photodetector 219. The optical wavelength-division-multiplexing apparatus 208 multiplexes the light signal from the optical coupler 207 and the monitoring and controlling signal, and transmits the multiplexed light signal downstream.

The monitoring and controlling apparatus 209 receives the signal of the wavelength λs from the optical wavelength-division-multiplexing apparatus 201, and obtains,an upstream transmission power from digital information included in the monitoring and controlling signal. The information regarding the transmission power is supplied to a loss calculating circuit 210. An output of an analog-to-digital converter 213 is also supplied to the loss calculating circuit 210. An electric signal corresponding to a level of the received light detected by the photodetector 215 is supplied to the analog-to-digital converter 213 via an amplifier 214. Accordingly, the loss calculating circuit 210 is provided with a transmission power value from the upstream and the digital value corresponding to the level of received light signal. The loss calculating circuit 210 obtains a difference between the two values so as to determine a loss of the received light signal from upstream.

Additionally, a part of the light signal which has been amplified by the EDFA is supplied to the photodetector 219 via the optical coupler 207. The photodetector 219 converts the supplied light signal into an electric signal by an opto-electric conversion, and detects a transmission power level. An output of the photodetector 219 is supplied to a differential calculating circuit 220. An output of the amplifier 214, which is a signal corresponding to a level of the signal before amplification, is also supplied to the differential calculating circuit 220. Accordingly, a gain of the optical amplifier 204 is obtained from an output of the differential calculating circuit 220. An output of the differential calculating circuit 220 is input to a differential amplifier 211 via an analog-to-digital converter 212.

A control is performed so as to equalize the gain of the optical amplifier 204 and the loss calculated by the loss calculating circuit 210. That is, a signal corresponding to the loss calculated by the loss calculating circuit 210 and a signal corresponding to the in of the optical amplifier 204 are supplied to a differential amplifier 211 so as to obtain a difference value therebetween. The difference value is supplied to a laser diode drive circuit 222. The laser diode drive circuit 222 increases or decreases an output of the pumping light source 216 in response to the difference value so as to equalize the gain of the optical amplifier 204 to the loss of the transmission path.

An electric signal corresponding to a transmission power level detected by the photodetector 219 is supplied to an analog-to-digital converter 218 via the amplifier 217. An output of the analog-to-digital converter 218 is supplied to a monitoring and controlling signal apparatus 221, and information regarding the transmission power level is provided in the monitoring and controlling signal which is transmitted downstream.

It should be noted that although the pumping light for the EDFA 204 is supplied in the rearward direction in FIG. 19, the pumping light may be supplied in the forward direction or both directions.

Figure 20:
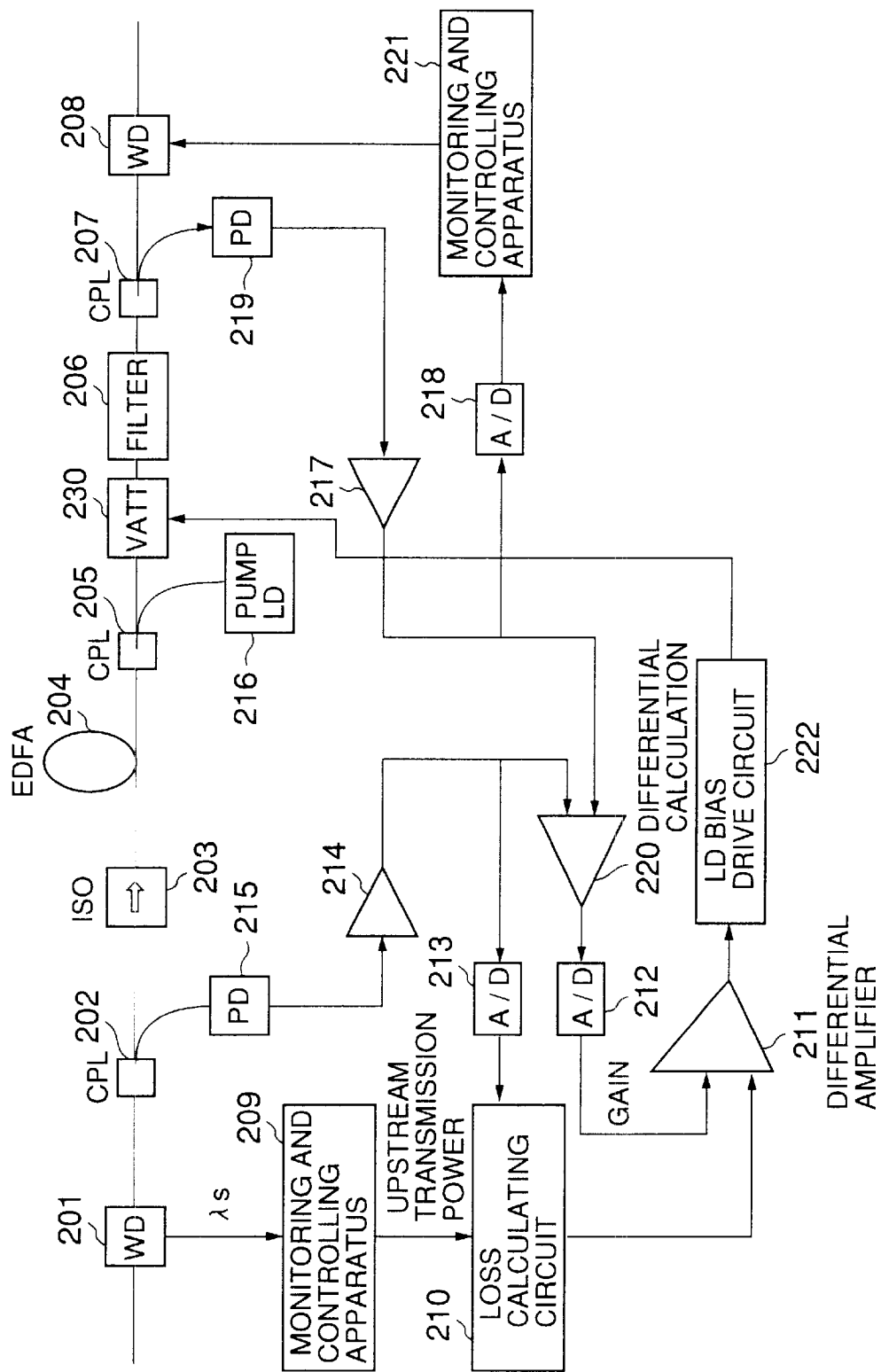
FIG. 20 is an illustration of a second example of an AGC control unit.

(7) A second example of the AGC control unit:

In the AGC control unit shown in FIG. 19, the gain of the optical amplifier 204 is controlled so that the gain of the optical amplifier 204 becomes equal to the loss calculated by the loss calculating circuit 210. However, as shown in FIG. 20, a variable attenuator 230 may be provided on the downstream side of the optical amplifier 204, and an amount of attenuation may be controlled by an output of the laser diode drive circuit 222. Thereby, a change in a gain tilt due to a fluctuation in a power of the pumping laser diode can be eliminated.

Figure 21:
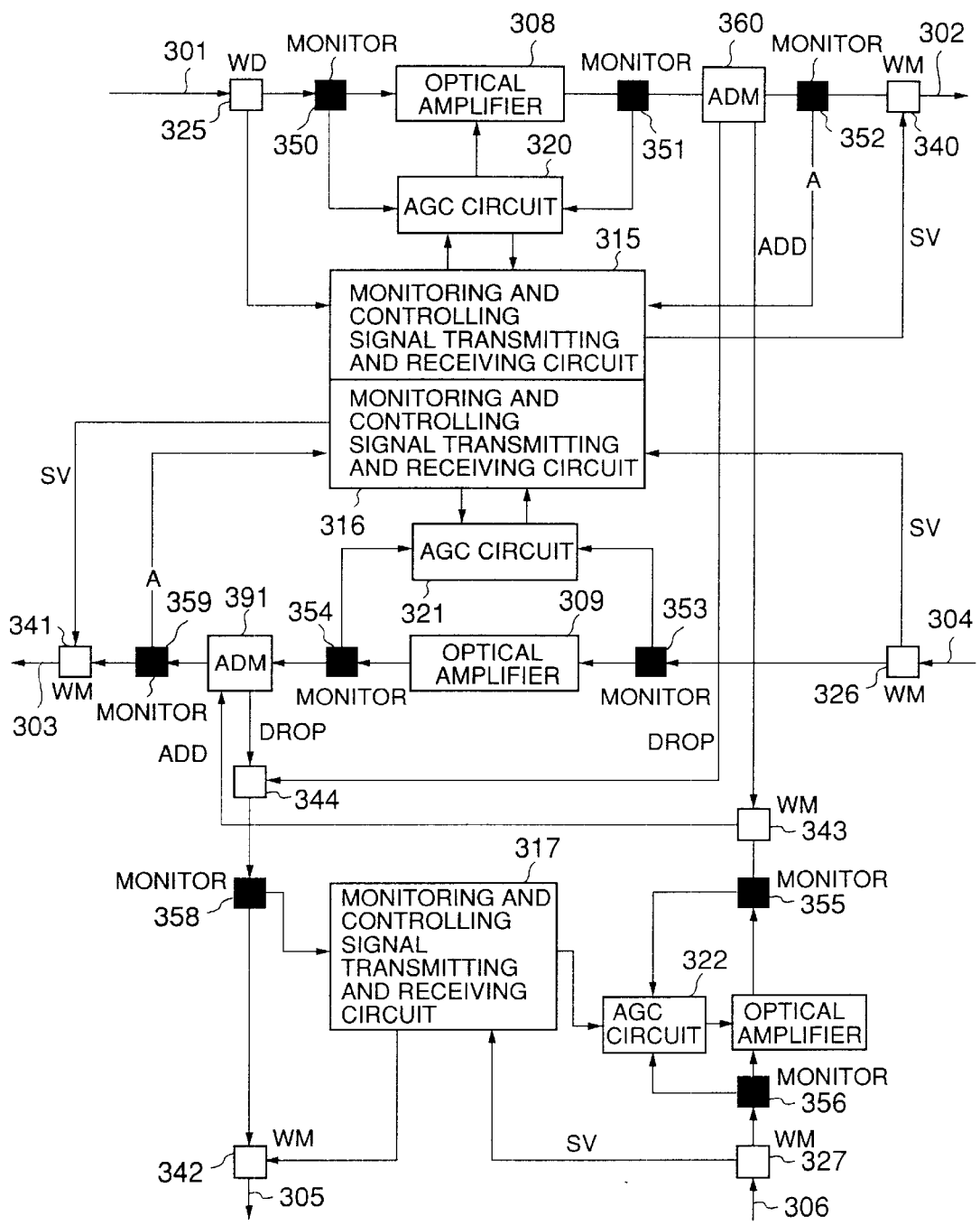
FIG. 21 is an illustration for explaining a first example of a trunk apparatus using an ADM system.

(8) A first example of a trunk apparatus in which the AGC control unit of an optical amplifier has an ADM function:

As shown in FIG. 21, the AGC control unit of an optical amplifier having an ADM function transmits a WDM signal received via a transmission line 301, 304 or 306 to a transmission path 302, 303 or 305. At this time, adding and dropping of signals are performed by the optical amplifier having an ADM function and, thus, a WDM signal different from the received WDM signal is transmitted downstream.

A signal on the transmission path 301 and a signal on the transmission path 304 are synthesized by a wave synthesizer 344, and the synthesized signals are transmitted to the transmission path 305. Additionally, a signal on the transmission path 306 is divided by a wave divider 343, and divided waves are transmitted to the transmission paths 302 and 303.

Figure 1A:
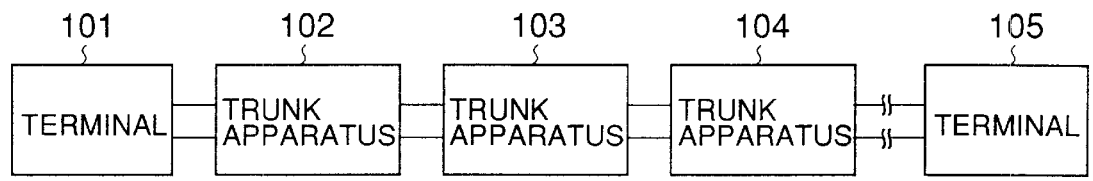
FIG. 1A is an illustration of a WDM communication system having a simplified structure.
Figure 1B:
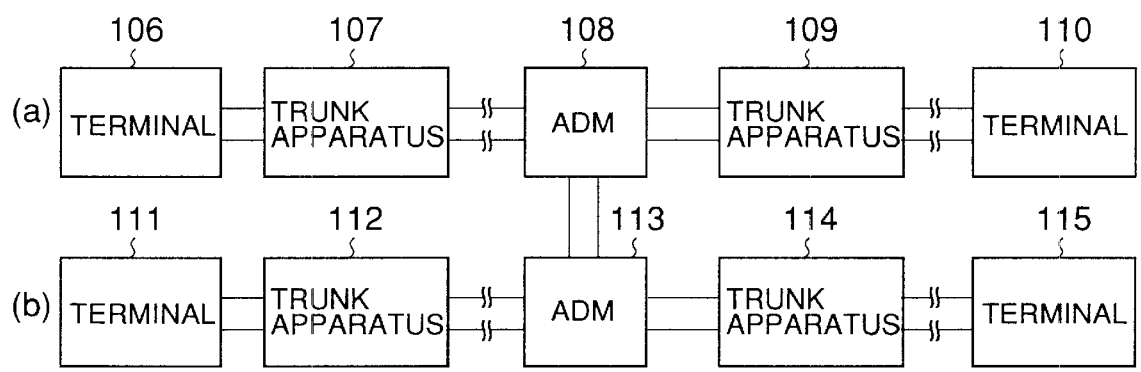
FIG. 1B is an illustration of a WDM communication system in which an ADM (add/drop multiplexer) is used.
Figure 1C:
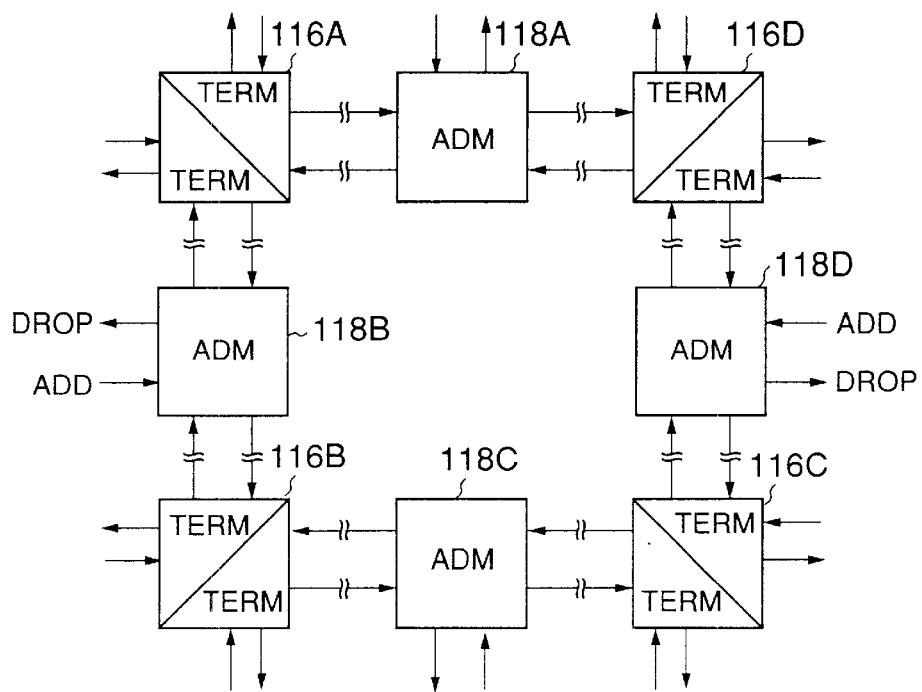
FIG. 1C is an illustration of a WDM communication system having a ring-type structure.
Figure 2:
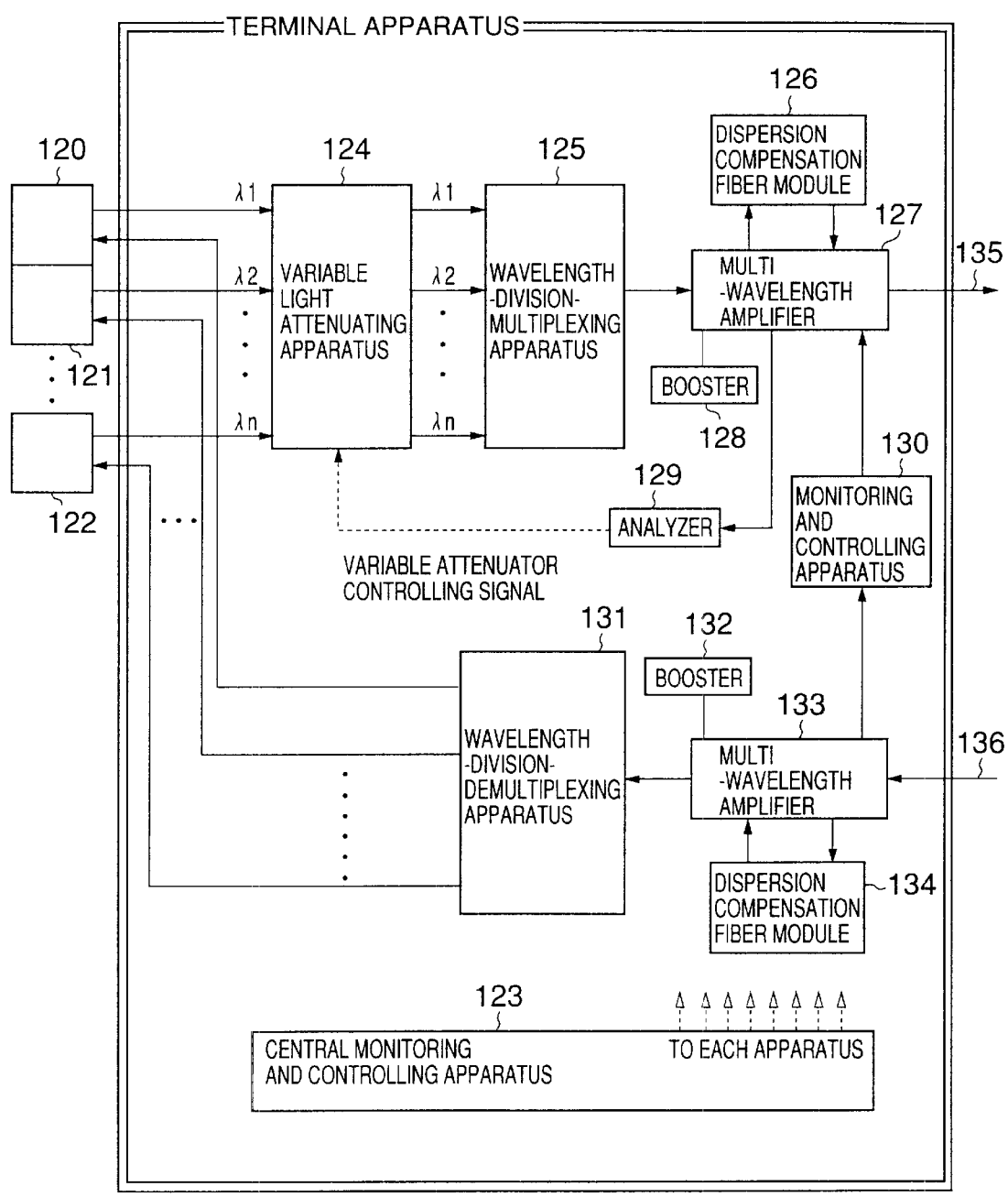
FIG. 2 is an illustration for explaining a structure of a terminal apparatus of a WDM communication system.
Figure 3:
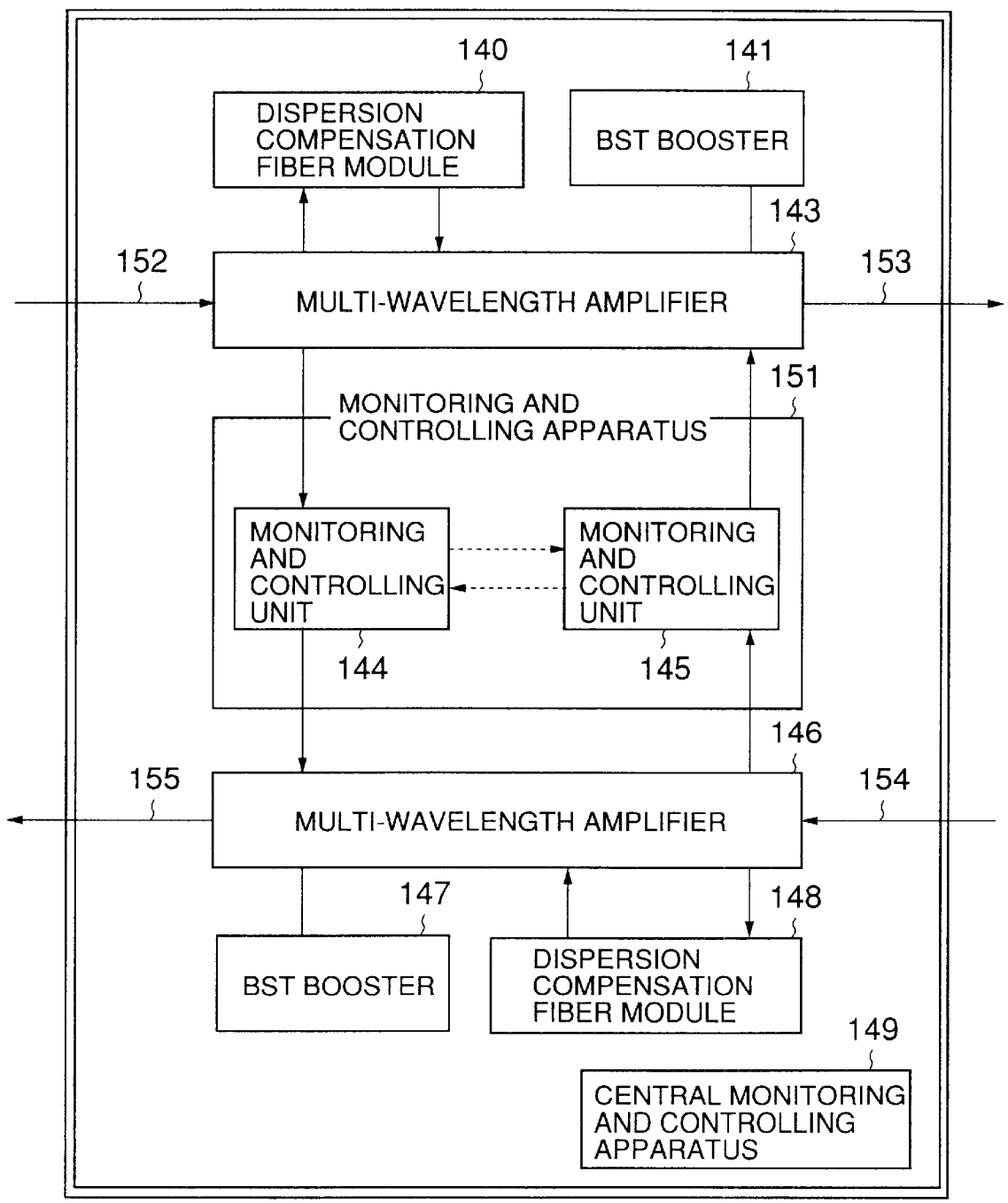
FIG. 3 is an illustration for explaining a structure of a trunk apparatus having no ADM.
Figure 4:
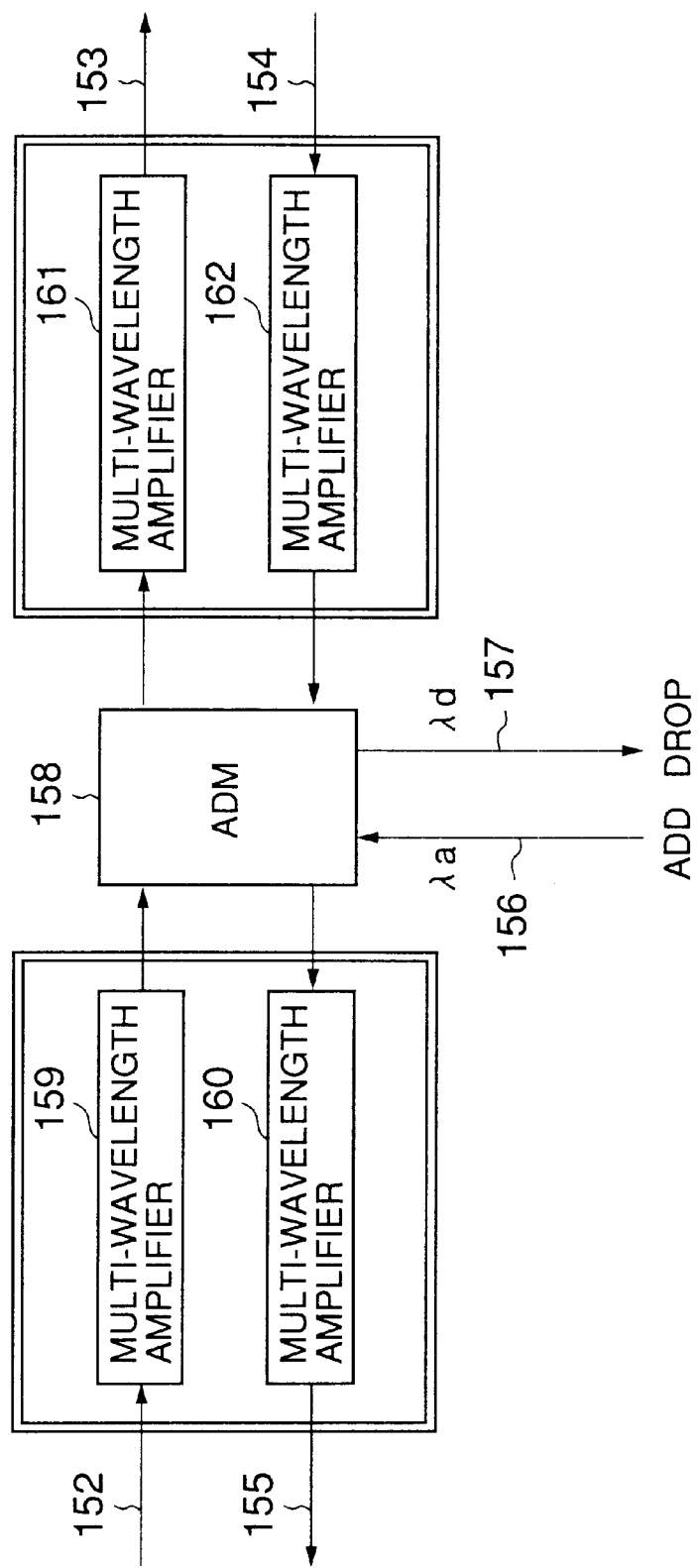
FIG. 4 is an illustration for explaining a structure of a trunk apparatus having an ADM.
Figure 5:
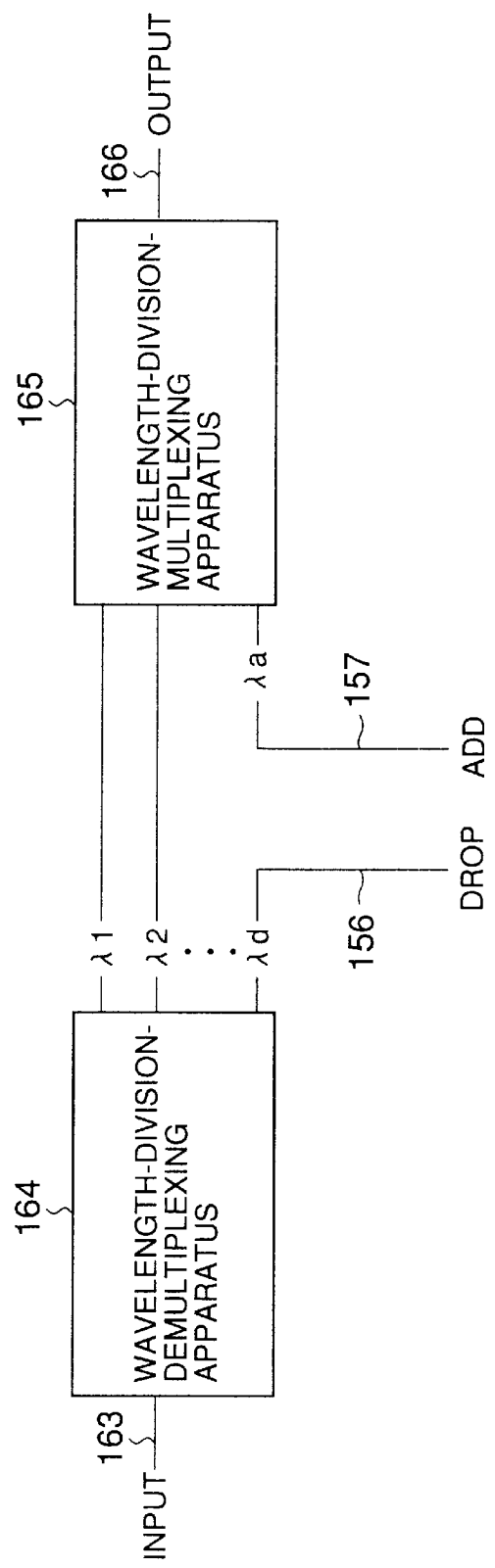
FIG. 5 is an illustration for explaining a structure of a passive ADM in a WDM communication system.
Figure 6:
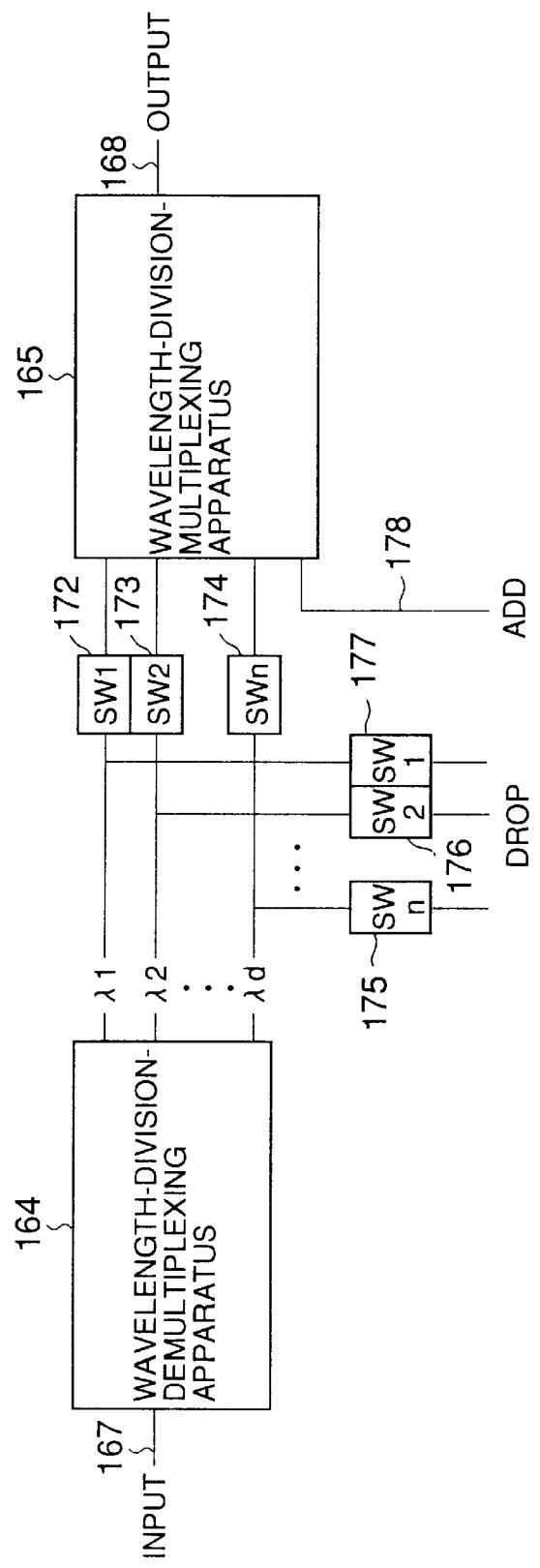
FIG. 6 is an illustration for explaining a structure of an active ADM in a WDM communication system.
Figure 7:
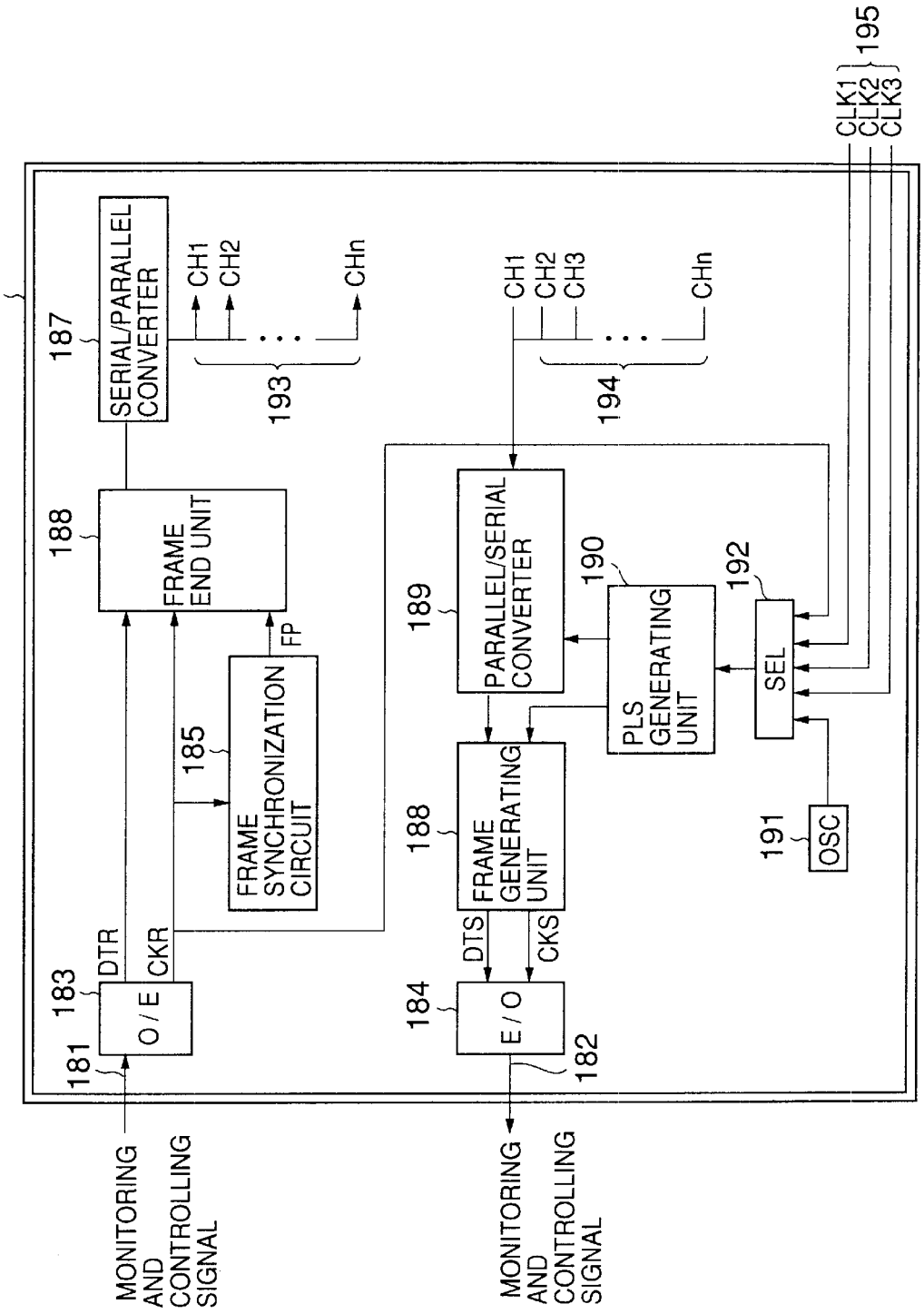
FIG. 7 is an illustration for explaining a structure of a monitoring and controlling apparatus.
Figure 8:
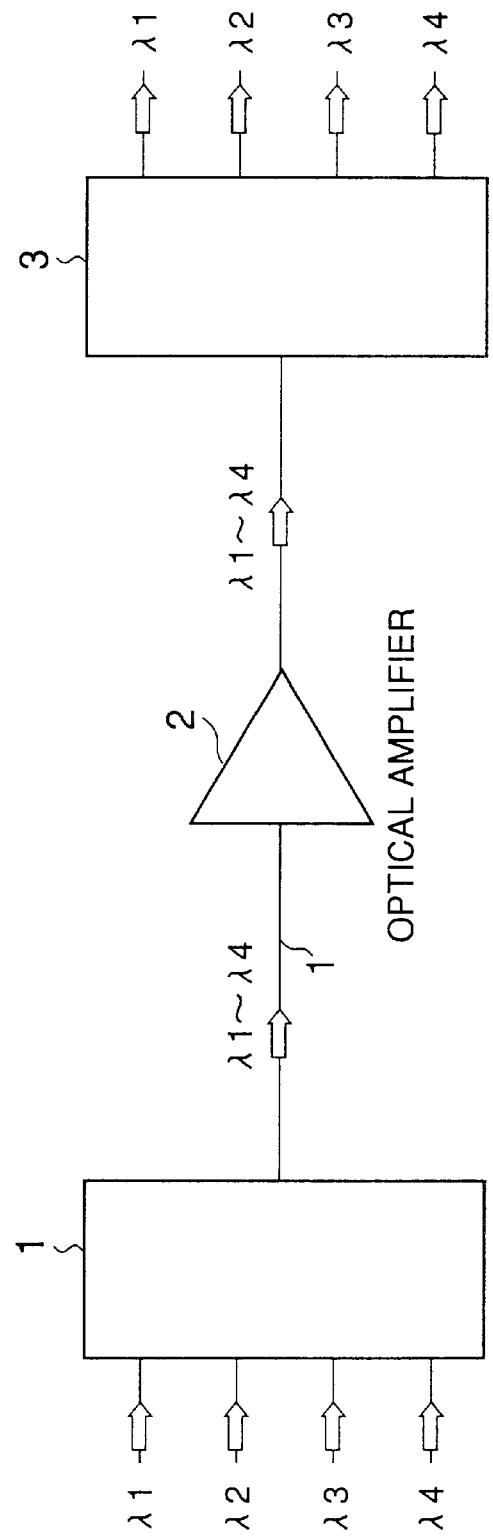
FIG. 8 is an illustration for explaining a simplified structure of a WDM communication system.
Figure 9:
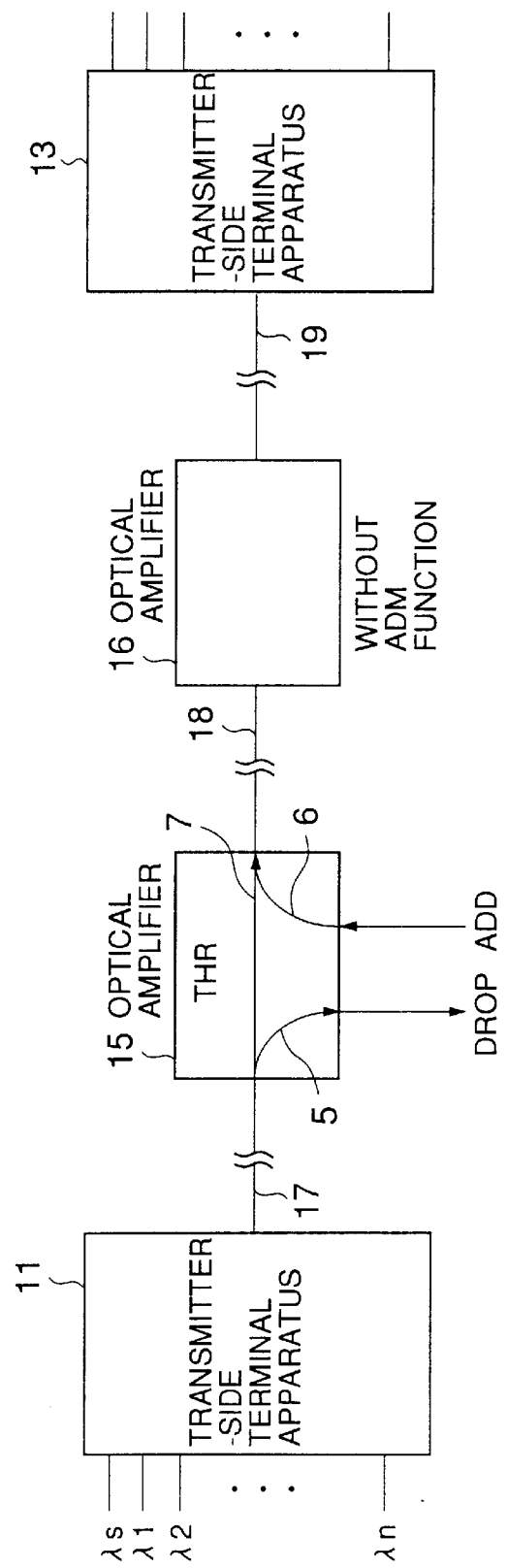
FIG. 9 is an illustration of a structure of a WDM communication system using an optical amplifier having an ADM function.

The wavelength-division-multiplexing light signals on the transmission paths 301, 304 and 306 are transmitted downstream via optical wavelength-division-demultiplexing apparatuses 325, 326 and 327, monitors 350, 353 and 356, optical amplifiers 308, 309 and 310, monitors 351, 354 and 355 and ADMs 360 and 391, monitors 352, 358 and 359, and optical wavelength-division-multiplexing apparatuses 340, 341 and 342, respectively. Each of the optical wavelength-division-demultiplexing apparatuses 325, 326 and 327 demultiplexes a signal of a monitoring wavelength λs provided with a monitoring and controlling signal SV from the received WDM signal, and supplies the signal of the wavelength signal λs to monitoring and controlling signal transmitting and receiving circuits 315, 316, and 317, respectively. Each of the monitors 350, 353 and 356 detects a level of a received signal which is a signal before being amplified by the respective optical amplifier. Each of the monitors 351, 354 and 355 detects a level of a signal which has been amplified by the respective optical amplifier. Each of the ADMs 360 and 391 may have a structure shown in FIGS. 4, 5 or 6 so as to add or drop signals of certain wavelengths. Each of the monitors 352, 358 and 359 detects a level of a signal actually transmitted after adding or dropping is performed by the ADM 360 or 391. Each of the optical wavelength-division-multiplexing apparatuses 340, 341 and 342 wavelength-division-multiplexes the monitoring and controlling signal SV supplied by the respective monitoring and controlling signal transmitting and receiving apparatuses 315, 316 and 317.

An operation of the AGC control unit shown in FIG. 21 is the same as the operation of the AGC control circuit shown in FIG. 12.

AGC circuits 320, 321 and 322 control the optical amplifiers 308, 309 and 310 so as to maintain gains of the optical amplifiers 308, 309 and 310, respectively. The control is performed based on outputs (upstream transmission power information) of the monitoring and controlling signal transmitting and receiving circuits 315, 316 and 317, outputs (a level of received signal or a signal level before amplification) of the monitors 350, 353 and 356 and outputs (a level of a signal to be transmitted or a level of a signal after amplification) of the monitors 351, 354 and 355.

The transmission power information of the upstream side is provided in the monitoring and controlling signal SV carried by the signal of the wavelength λs for monitoring and controlling. The signal of the wavelength λs which carries the monitoring and controlling signal SV is dropped by the optical wavelength-division-demultiplexing apparatuses 325, 326 and 327, and is supplied to the monitoring and controlling signal transmitting and receiving circuits 315, 316 and 317, respectively. The monitoring and controlling signal transmitting and receiving circuits 315, 316 and 317 obtain information regarding a level of a transmission power of a preceding stage from digital information included in the monitoring and controlling signal SV carried by the signal of the wavelength λs, and supply the information to the AGC circuits 320, 321 and 322, respectively. On the other hand, the outputs (a level of the received signal) of the monitors 350, 353 and 356 are supplied to the AGC circuits 320, 321 and 322, respectively. Accordingly, the AGC circuits 320, 321 and 322 obtain a loss a of a transmission path in the preceding stage.

Additionally, the gain of the optical amplifiers (EDFAs) 308, 309 and 310 can be obtained by the AGC circuits 320, 321 and 322 from the outputs of the monitors 350, 353 and 356 and the outputs of the monitors 351, 354 and 355. The AGC circuits 320, 321 and 322 provide control signals so that the gains of the optical amplifiers 308, 309, and 310 are equal to the loss of the preceding stage. Thereby, the optical amplifiers 308, 309 and 310 can compensate for the above-mentioned loss, and the outputs of the optical amplifiers 308, 309 and 310 are constant. Additionally, the digital values of the transmission power value A of the monitors 352 and 359 are transmitted from the AGC circuits 320 an 321 to the monitoring and controlling signal transmitting and receiving circuits 315 and 316, respectively. The monitoring and controlling signal transmitting and receiving circuits 315 and 316 render the signal of the wavelength λs to carry the digital value of the transmission power value A, and transmit the signal via the optical wavelength-division-multiplexing apparatuses 340 and 341.

It should be noted that although the above-mentioned trunk apparatus having optical amplifiers having the ADM function is of a T-type arrangement, the present invention is not limited to the T-type arrangement and a star-type arrangement may be used.

Figure 22:
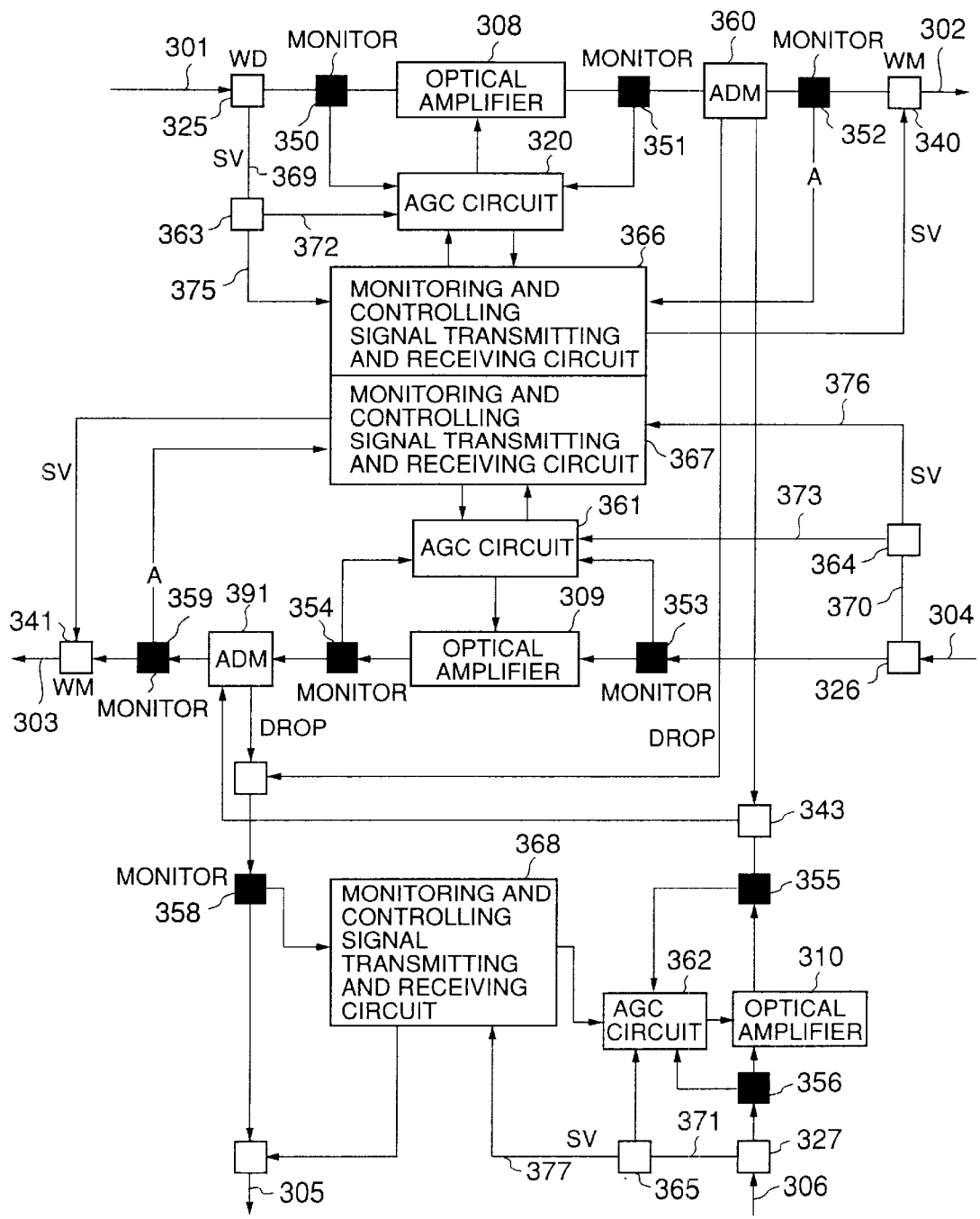
FIG. 22 is an illustration for explaining a second example of a trunk apparatus using an ADM system.
Figure 23:
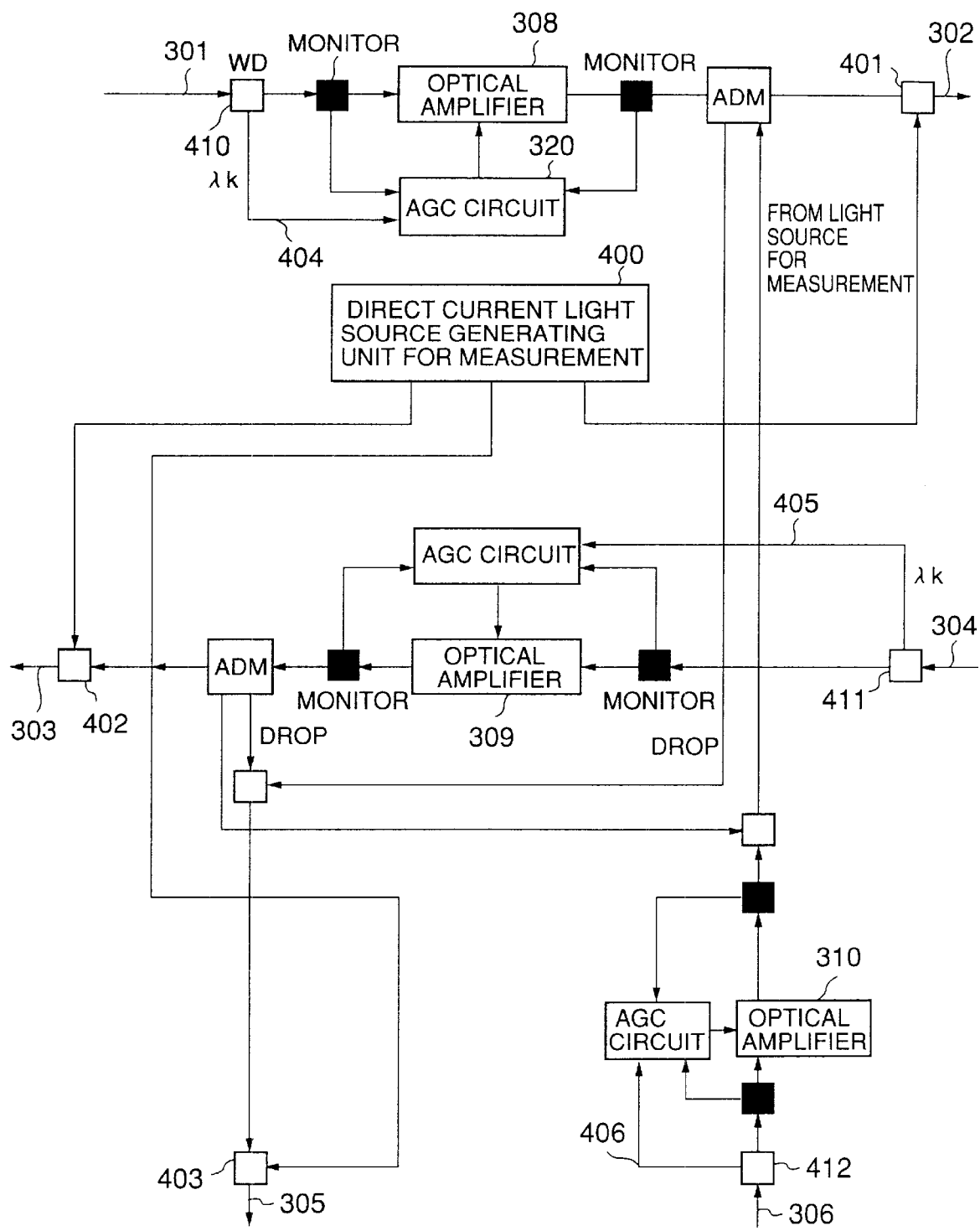
FIG. 23 is an illustration for explaining a third example of a trunk apparatus using an ADM system.

(9) A second example of a trunk apparatus in which the AGC control unit of an optical amplifier has an ADM function:

In trunk apparatuses shown in FIGS. 22 and 23, a part of the structure of the AGC control unit shown in FIG. 21 is changed, and a loss of the transmission section is compensated for by using a monitoring and controlling signal light or a measurement light.

The trunk apparatus shown in FIG. 22 performs an AGC by using a level of the signal of the wavelength λs carrying the monitoring and controlling signal. The signal of the wavelength λs which carries the monitoring and controlling signal SV is dropped by the optical wavelength-division-demultiplexing apparatuses 325, 326 and 327, and is supplied to the monitoring and controlling signal transmitting and receiving circuits 366, 367 and 368, respectively. The monitoring and controlling signal transmitting and receiving circuits 366, 367 and 368 calculate a loss of a transmission section based on a reception level of the signal of the wavelength λs carrying the monitoring and controlling signal light which is a known level, and supplies the information to the AGC circuits 320, 361 and 362, respectively. The AGC circuits 320, 361 and 362 obtain gains of the optical amplifiers 308, 309 and 310 from the outputs (a level of a signal before amplification) of the monitors 350, 353 and 356 and the outputs (a level of a signal after amplification) of the monitors 351, 354 and 355. The AGC circuits 320, 361 and 362 control the gains of the respective optical amplifiers 308, 309 and 310 so that the gains of the optical amplifiers are equal to the loss. Thereby, the optical amplifiers 308, 309 and 310 can compensate for the loss of the upstream side, and the outputs thereof are maintained constant. It should be noted that the loss of the transmission path may be calculated by the AGC circuits 320, 361 and 362. Additionally, although the above-mentioned trunk apparatus having optical amplifiers having the ADM function is of a T-type arrangement, the present invention is not limited to the T-type arrangement and a star-type arrangement may be used.

The trunk apparatus shown in FIG. 23 performs an AGC by using a level of the wavelength λk of a light for measurement. In FIG. 23, the structure of the optical amplifier shown in FIG. 13 is applied to an AGC control unit of an optical amplifier having an ADM function. The wavelength λk which is output from a direct current light source 400 for measurement is transmitted downstream by being wavelength-division-multiplexed by wavelength-division-multiplexing apparatuses 401, 402 and 403. A method for performing an AGC control is the same as that described with reference to FIG. 13, and descriptions thereof will be omitted. Additionally, although the above-mentioned trunk apparatus having optical amplifiers having the ADM function is of a T-type arrangement, the present invention is not limited to the T-type arrangement and a star-type arrangement may be used.

As mentioned above, according to the present invention, a WDM communication system can be constructed in which signals of different wavelengths are not influenced by failure in a signal or an increase or decrease in the number signals of different wavelengths. However, if the number of signals of different wavelengths is increased without limitation, a gain of an optical amplifier will saturate. In such a case, the gain of the optical amplifier cannot be increased by an AGC control. That is, if the number of signals of the wavelengths is increased by adding signals of new wavelengths, a minimum gain cannot be maintained for each wavelength in the optical amplifier. Such a condition is a limit for adding new wavelengths. Accordingly, when adding signals of new wavelengths, it must be previously confirmed whether all optical amplifiers in trunk lines can be operated without problems caused by such an addition of signals of new wavelengths. For such a confirmation, a terminal apparatus must check information regarding a power level of a signal received by each optical amplifier and also information regarding the limit for adding signals of new wavelengths by which an operation of each optical amplifier can be guaranteed.

In the present invention, each optical amplifier has information regarding a limit of amplification by which amplification thereof is guaranteed. Additionally, each optical amplifier always monitors a power level of a signal input thereto. Accordingly, the terminal apparatus can check such information when a signal having a new wavelength is added. That is, when the addition is made in a transmitting unit of the terminal apparatus, the information for a limit of amplification regarding each optical amplifier provided along a path to the terminal unit is provided to the terminal unit. A determination as to whether or not a signal of a new wavelength can be added is made based on whether or not the optical amplifier in each trunk apparatus can recover a loss of the transmission path while maintaining a minimum gain for each wavelength. The terminal apparatus determines whether or not the addition can be performed based on an input level and a number of pumping light sources for additional wavelengths.

Figure 24:
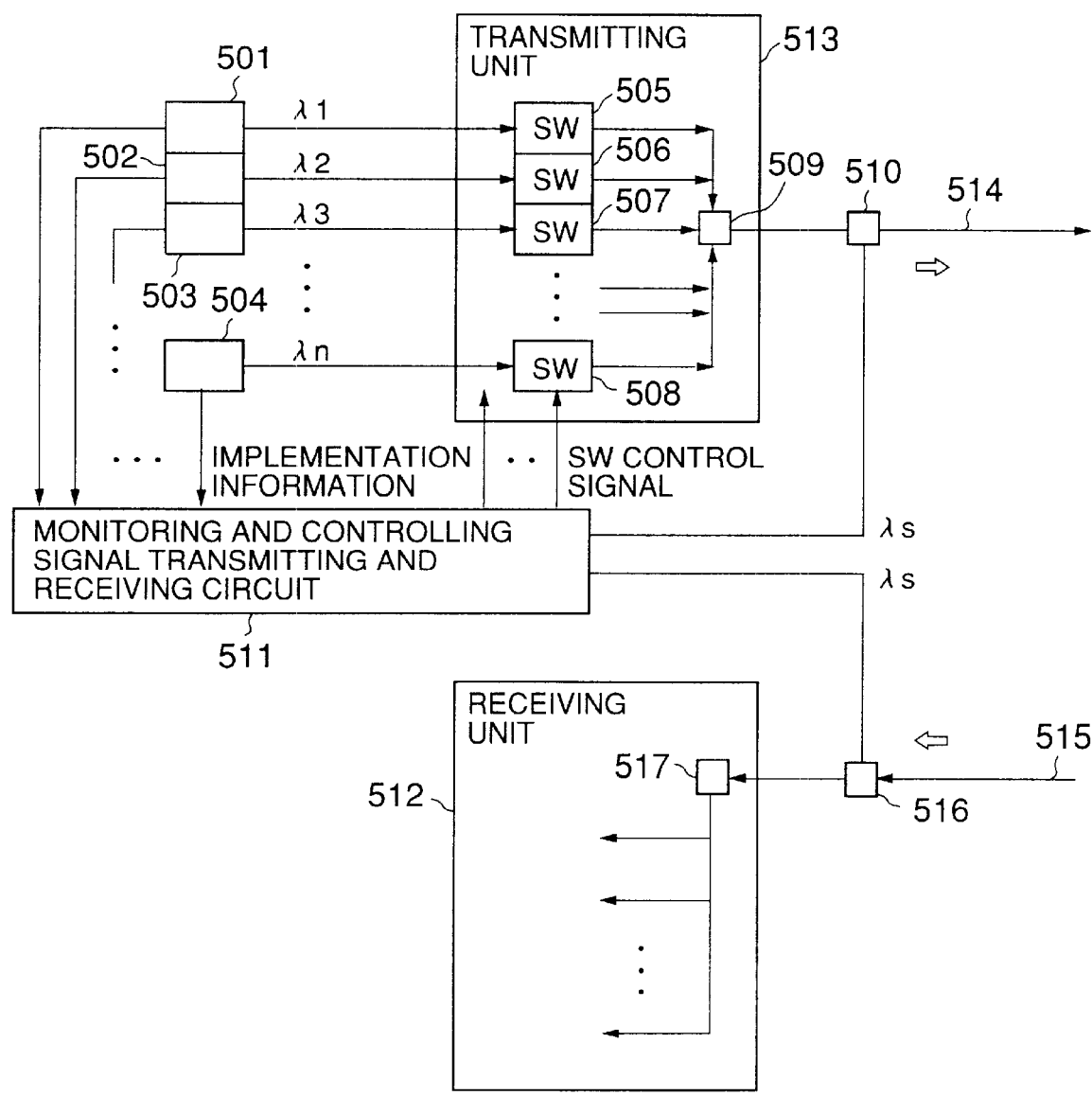
FIG. 24 is an illustration for explaining a first example of a structure of a terminal apparatus in a WDM communication system.

FIG. 24 shows a structure of a terminal apparatus which performs the above-mentioned process. The terminal apparatus comprises a monitoring and controlling signal transmitting and receiving circuit 511, light sources 501 to 504, a receiving unit 512, a transmitting unit 513, a wavelength-division-multiplexing apparatus 510 and a wavelength-division-demultiplexing apparatus 516. The transmitting unit 513 comprises switches 505 to 508 which select the light sources and an optical wave synthesizer 509. A synthesized signal is transmitted to a transmission path 514 via the wavelength-division-multiplexing apparatus 510. The receiving unit 512 comprises a distributing unit 517 which separates each wavelength received through a transmission path 515 via the wavelength-division-demultiplexing apparatus 516.

Figure 25:
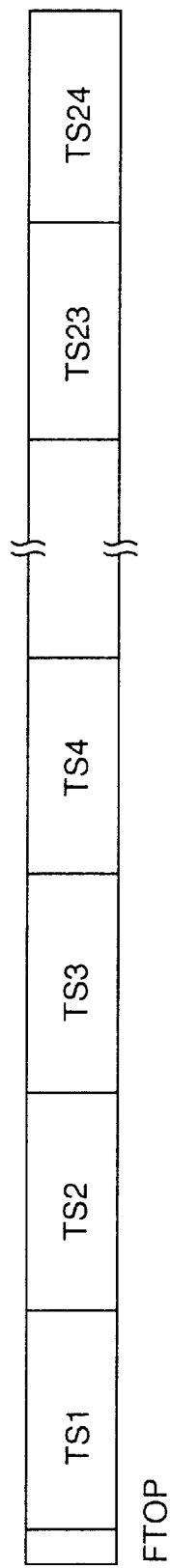
FIG. 25 is an illustration for explaining a structure of a monitoring and controlling signal.
Figure 26:
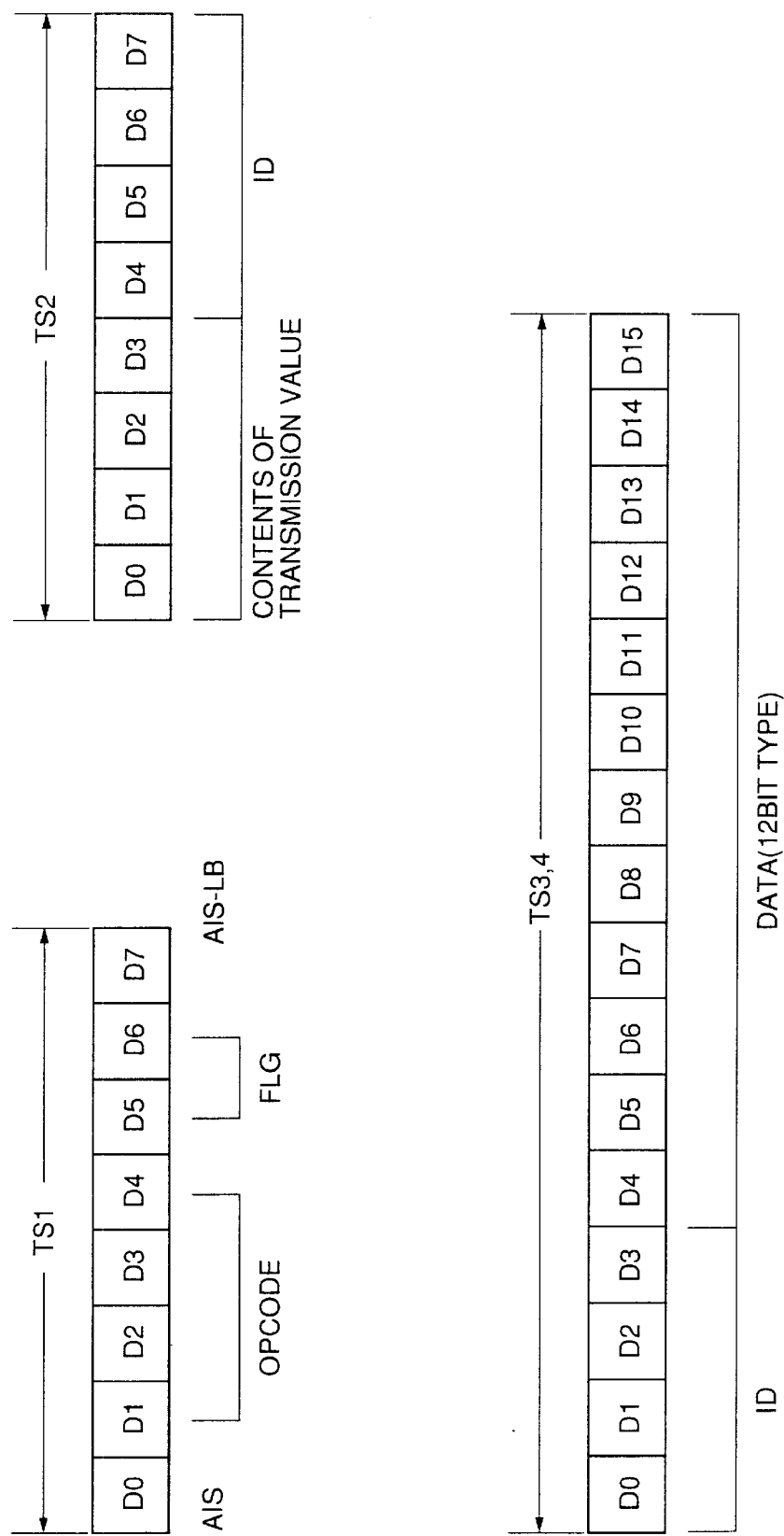
FIG. 26 is an illustration for explaining a structure of contents of TS.

The monitoring and controlling signal transmitting and receiving circuit 511 sends information regarding a state of an optical amplifier by using a multi-frame shown in FIG. 25. In FIG. 25, an FTOP is a signal for indicating the beginning of a frame. Data is provided in TS1 to TS24 of the frame. FIG. 26 shows contents of the TS1 to TS24. FIG. 27 shows a definition of OPCODE which constitutes a part of data. FIG. 28 shows a definition of FLG which is a part of data. AIS is a flag indicating an abnormality in a monitoring and controlling signal. That is, the AIS announces an abnormality on the upstream side. AIS-LB is a flag indicating an abnormality in a reverse direction. That is, the ALS-LB announces an abnormality on the downstream side. ID is a signal for designating an optical amplifier. Thereby, each optical amplifier can send information regarding an input level of the optical amplifier, information regarding a limit for a guaranteed operation and information regarding presence of an addition of a signal of a new wavelength.

Figure 29:
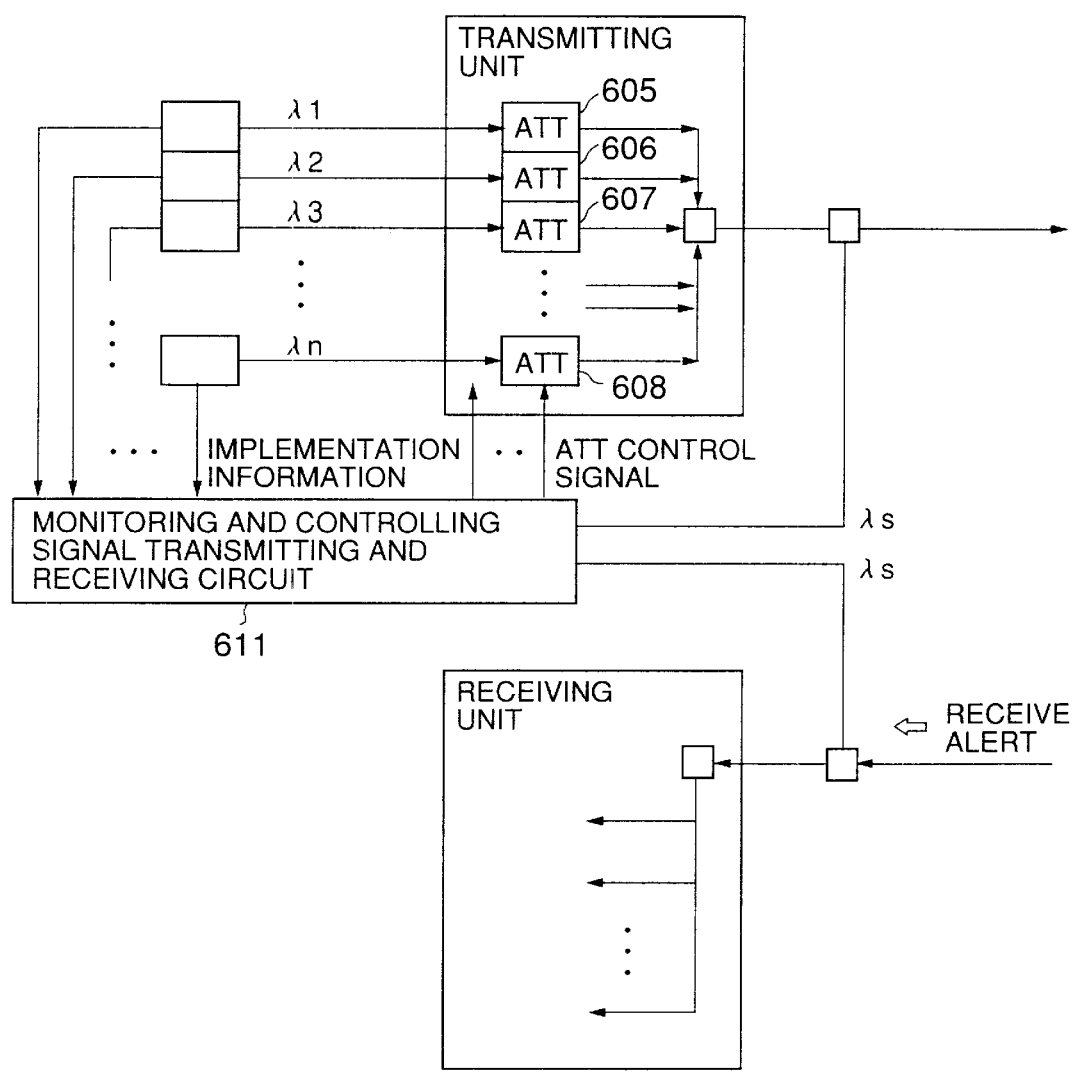
FIG. 29 is an illustration for explaining a second example of a structure of a terminal apparatus in a WDM communication system.

However, in a complex network using an ADM, it is difficult to manage a path along which a particular wavelength is transmitted. For example, when an optical amplifier of a multi-bender is present, there are various structures for the optical amplifier. In such a case, the limit of each optical amplifier is previously set to a smaller value, and an optical power is gradually increased when an addition of signals of different wavelengths is made. At this time, each optical amplifier sends an alarm when the limit having a margin is reached. Upon receipt of such an alarm, the terminal apparatus reduces a transmission power. Thereby, a saturation of each optical amplifier due to addition of a new wavelength can be prevented in a complex network using an ADM. FIG. 29 shows a terminal apparatus having a structure for achieving the above-mentioned process. In FIG. 29, attenuators 605 to 608 are provided instead of the switches 505 to 508 shown in FIG. 24. The attenuators 605 to 608 are controlled by an output of a monitoring and controlling signal transmitting and receiving circuit 611.

The present invention is not limited to the specifically disclosed embodiments, and variations and modifications may be made without departing from the scope of the present invention.

The present application is based on Japanese priority application No. 10-060068 filed on Mar. 11, 1998, the entire contents of which are hereby incorporated by reference.

What is claimed is:

1. A local trunk apparatus of a wavelength-division-multiplex communication system comprises:
    an optical amplifier;
    a transmission power monitor for monitoring a transmission power of said local trunk apparatus;
    a monitoring and controlling signal transmitting and receiving circuit for transmitting and receiving a monitoring and controlling signal; and
    an automatic gain control circuit for performing an automatic gain control with respect to said optical amplifier;
    wherein said monitoring and controlling signal transmitting and receiving circuit sends transmission power information regarding the transmission power monitored by said transmission power monitor to an immediately proceeding trunk apparatus located on a downstream side of said local trunk apparatus;
    said monitoring and controlling signal transmitting and receiving circuit receives transmission power information sent from an immediately preceding trunk apparatus located on an upstream side of said local trunk apparatus, and sends the received transmission power information to said automatic gain control circuit; and
    said automatic gain control circuit controls said optical amplifier based on the transmission power information received from the immediately preceding trunk apparatus and reception power information regarding reception power at said local trunk apparatus, so as to equalize the transmission power of said local trunk apparatus to the transmission power of said immediately preceding trunk apparatus in consideration of changes in a loss of a transmission path between said local trunk apparatus and said immediately preceding trunk apparatus.

2. The local trunk apparatus as claimed in claim 1, further comprising:
    a reception power monitor for monitoring the reception power; and
    a loss calculating circuit for calculating a loss of a transmission path between said local trunk apparatus and said immediately preceding trunk apparatus,
    wherein said loss calculating circuit calculates the loss of the transmission path between said local trunk apparatus and said immediately preceding trunk apparatus based on an output of said reception power monitor and the transmission power information received from said immediately preceding trunk apparatus; and
    said automatic gain control circuit controls said optical amplifier based on a result of the calculation of said loss calculating circuit so as to compensate for the loss of the transmission path between said local trunk apparatus and said immediately preceding trunk apparatus.

3. The local trunk apparatus as claimed in claim 2, further comprising:
    a direct-current light source having a predetermined transmission power; and
    means for transmitting an output of said direct current light source to said immediately proceeding trunk apparatus,
    wherein said loss calculating circuit calculates the loss of the transmission path between said local trunk apparatus and said immediately preceding trunk apparatus based on the output of said reception power monitor for a direct-current light source of said immediately preceding trunk apparatus and information regarding a transmission power of the direct-current light source of said immediately preceding trunk apparatus, instead of calculating the loss based on the output of said reception power monitor and the transmission power information of said immediately preceding trunk apparatus.

4. The local trunk apparatus as claimed in claim 3, wherein said transmission power monitor monitors said direct-current light source;

said monitoring and controlling signal transmitting and receiving circuit sends transmission power information regarding a transmission power of said direct-current light source monitored by said transmission power monitor to said immediately proceeding trunk apparatus; and said loss calculating circuit calculates the loss of the transmission path between said local trunk apparatus and said immediately preceding trunk apparatus based on the output of said reception power monitor for said direct-current light source of said immediately preceding trunk apparatus and information regarding the transmission power of the direct-current light source of said immediately preceding trunk apparatus supplied by said monitoring and controlling signal transmitting and receiving circuit.

5. The local trunk apparatus as claimed in claim 2, further comprising:

a monitoring and controlling signal light having a predetermined transmission power; and means for transmitting said monitoring and controlling signal light to said immediately proceeding trunk apparatus, wherein said loss calculating circuit calculates the loss of the transmission path between said local trunk apparatus and said immediately preceding trunk apparatus based on the output of said reception power monitor for a monitoring and controlling signal light of said immediately preceding trunk apparatus and information regarding a transmission power of the monitoring and controlling signal light of said immediately preceding trunk apparatus, instead of calculating the loss based on the output of said reception power monitor and the transmission power information of said immediately preceding trunk apparatus received by said monitoring and controlling signal transmitting and receiving apparatus.

6. The local trunk apparatus as claimed in claim 5, wherein said transmission power monitor monitors said monitoring and controlling signal light;

said monitoring and controlling signal transmitting and receiving circuit sends transmission power information regarding a transmission power of said monitoring and controlling signal light monitored by said transmission power monitor to said immediately proceeding trunk apparatus; and said loss calculating circuit calculates the loss of the transmission path between said local trunk apparatus and said immediately preceding trunk apparatus based on the output of said reception power monitor for said monitoring and controlling signal light of said immediately preceding trunk apparatus and information regarding the transmission power of the monitoring and controlling signal light of said immediately preceding trunk apparatus supplied by said monitoring and controlling signal transmitting and receiving circuit.

7. The local trunk apparatus as claimed in claim 5, wherein a power level of said monitoring and controlling signal light is periodically set to a constant level.

8. The local trunk apparatus as claimed in claim 1, further comprising:

an add-drop-multiplexer.

9. The local trunk apparatus as claimed in claim 1, further comprising:

a memory unit for storing information regarding the automatic gain control.

10. A local trunk apparatus of a wavelength division-multiplex communication system having an add and drop multiplexing function, said local trunk apparatus comprising:

an optical amplifier;

a transmission power monitor for monitoring a transmission power of said local trunk apparatus;

a monitoring and controlling signal transmitting and receiving circuit for transmitting and receiving a monitoring and controlling signal; and an automatic gain control circuit for performing an automatic gain control with respect to said optical amplifier, wherein said monitoring and controlling signal transmitting and receiving circuit sends transmission power information to an immediately proceeding trunk apparatus located on a downstream side of said local trunk apparatus, said transmission power information regarding an overall transmission light except for a monitoring and controlling signal light of said local trunk apparatus;

said monitoring and controlling signal transmitting and receiving circuit receives the transmission power information sent from an immediately preceding trunk apparatus located on an upstream side of said local trunk apparatus, and sends the received transmission power information to said automatic gain control circuit; and said automatic gain control circuit controls said optical amplifier based on the transmission power information received from the immediately preceding trunk apparatus and reception power information regarding reception power at said local trunk apparatus, so as to equalize the transmission power of said local trunk apparatus to the transmission power of said immediately preceding trunk apparatus in consideration of changes in a loss of a transmission path between said local trunk apparatus and said immediately preceding trunk apparatus.

11. The local trunk apparatus as claimed in claim 10, further comprising:

a memory unit for storing information regarding the automatic gain control.

12. A method for monitoring and controlling a wavelength-division-multiplex communication system, comprising:

sending transmission power information to an immediately proceeding trunk apparatus located on a downstream side, the transmission power information being sent from one of a transmitting terminal apparatus and trunk apparatuses; and performing an automatic gain control with respect to an optical amplifier provided in each of the trunk apparatuses based on transmission power information received from an immediately preceding trunk apparatus and reception power information regarding reception power at a local trunk apparatus, so as to equalize a transmission power of each trunk apparatus to a transmission power of the immediately preceding trunk apparatus in consideration of changes in a loss of a transmission path between said local trunk apparatus and said immediately preceding trunk apparatus.

* * * * *